United States Patent
Matsumoto et al.

(10) Patent No.: US 6,757,726 B2
(45) Date of Patent: Jun. 29, 2004

(54) CACHE SERVER HAVING A CACHE-DATA-LIST TABLE STORING INFORMATION CONCERNING DATA RETAINED BY OTHER CACHE SERVERS

(75) Inventors: Takesi Matsumoto, Yokohama (JP); Hitoshi Ikeda, Yokohama (JP); Keiichiro Shibata, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 09/879,780

(22) Filed: Jun. 12, 2001

(65) Prior Publication Data

US 2002/0129207 A1 Sep. 12, 2002

(30) Foreign Application Priority Data

Feb. 23, 2001 (JP) ........................................ 2001-048800

(51) Int. Cl.[7] .............................................. G06F 12/06
(52) U.S. Cl. ..................... 709/223; 709/228; 707/104.1
(58) Field of Search ............................... 709/206, 218, 709/220, 222, 223, 225, 228, 229, 232; 707/104.1; 711/118, 3, 122; 714/43

(56) References Cited

U.S. PATENT DOCUMENTS

| | | | | |
|---|---|---|---|---|
| 6,070,228 A | * | 5/2000 | Belknap et al. ............ | 711/118 |
| 6,192,408 B1 | * | 2/2001 | Vahalia et al. .............. | 709/229 |
| 6,289,354 B1 | * | 9/2001 | Aggarwal et al. ........ | 707/104.1 |
| 6,347,312 B1 | * | 2/2002 | Byrne et al. .................. | 707/3 |
| 6,418,544 B1 | * | 7/2002 | Nesbitt et al. ................ | 714/43 |
| 6,438,652 B1 | * | 8/2002 | Jordan et al. ............... | 711/120 |
| 6,542,964 B1 | * | 4/2003 | Scharber ..................... | 711/122 |

FOREIGN PATENT DOCUMENTS

| JP | 08241260 | 9/1996 |
|---|---|---|
| JP | 11110324 | 4/1999 |

* cited by examiner

*Primary Examiner*—Glenton B. Burgess
*Assistant Examiner*—Khanh Quang Dinh
(74) *Attorney, Agent, or Firm*—Katten Muchin Zavis Rosenman

(57) ABSTRACT

A cache server is provided in an internal network. The cache server comprises a cache-data-list table and a cache-data-list administrating unit. The cache-data-list table stores information concerning data retained by other cache servers on an individual cache server basis. The cache-data-list administrating unit receives a data-inquiry request from one of the other cache servers, and searches the cache-data-list table for cache-server information indicating another one of the other cache servers retaining data regarding the data-inquiry request so as to send the cache-server information to the one of the other cache servers.

2 Claims, 34 Drawing Sheets

| DISTANCE LIMIT BETWEEN MEMBER CACHE-SERVERS | MINIMUM VACANT CAPACITY |
|---|---|
| 3 | 10240 |

FIG.8

| NUMBER | MEMBER-CACHE-SERVER NAME | IP ADDRESS | PROXY NAME | LEVEL NUMBER |
|---|---|---|---|---|
| 1 | A | 10.123.0.2 | Proxy.aaa.co.jp | 1 |
| 2 | B | 10.123.4.2 | Proxy.bbb.co.jp | 1 |
| 3 | C | 10.123.8.2 | Proxy.ccc.co.jp | 2 |
| 4 | D | 10.123.12.2 | Proxy.ddd.co.jp | 2 |
| 5 | E | 10.123.14.2 | Proxy.eee.co.jp | 3 |

FIG.9

| RETAINED URL | RETAINING SERVER NUMBER | DATA CREATION DATE | RELATED DATA |
|---|---|---|---|
| www.vahoo.co.jp | 1 | 2000/07/07 | — |
| www.fujitsu.co.jp/in/nrnduct | 3 | 2000/07/01 | — |
| www.vahoo.co.jp | 5 | 2000/07/07 | — |
| www.fujitsu.co.jp/in/nrnduct | 2 | 2000/07/23 | — |
| www.lvcos.co.jp/dir/computer.internet | 1 | 2000/07/04 | |

FIG.10

| NUMBER / NUMBER | 1 | 2 | 3 | 4 | 5 |
|---|---|---|---|---|---|
| 1 |  | — | — | — | — |
| 2 | 2 |  | — | — | — |
| 3 | 1 | 3 |  | — | — |
| 4 | 3 | 1 | 4 |  | — |
| 5 | 4 | 2 | 5 | 1 |  |

FIG.12

| KEYWORD | FREQUENCY OF APPEARANCES |
|---------|--------------------------|
| CATV    | 1                        |
| PROXY   | 10                       |

FIG.34
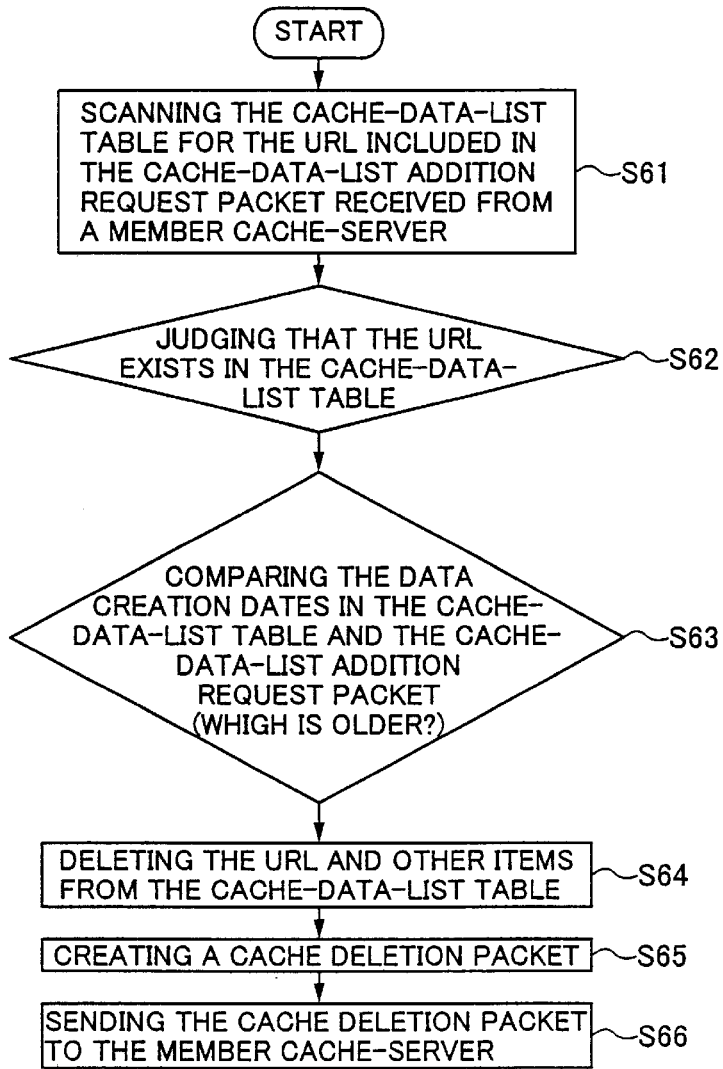
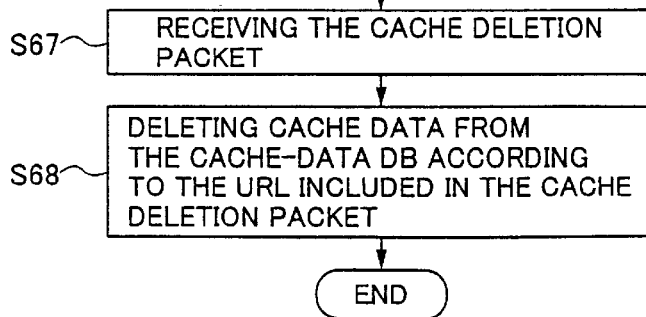

CACHE SERVER HAVING A CACHE-DATA-LIST TABLE STORING INFORMATION CONCERNING DATA RETAINED BY OTHER CACHE SERVERS

BACKGROUND OF THE INVENTION

1. Field of the Invention

The present invention generally relates to a cache server and a distributed cache server system and, more particularly, to a cache server and a distributed cache server system which reduce a traffic of an external network.

2. Description of the Related Art

Recently, as computer networks, such as the Internet, have developed, people have come to dispatch various sorts of information to computer networks, as well as browse various sorts of information from computer networks.

In the Internet, for example, large-amount information, such as moving images and music, has been increasingly furnished, and electronic commerce has become popular, partly due to the spread of information technology. Accordingly, the amount of data existing in the Internet is increasing day by day.

Conventionally, in order to deal with such an increasing amount of data, a cache server or a proxy server having a caching function is provided between an internal network such as a LAN (local area network) and an external network such as the Internet. The conventional cache server or the proxy server having a caching function (hereinafter generally referred to as a cache server) reduces the traffic between the internal network and the external network by temporarily caching data sent from the external network upon connection from the internal network to the external network.

FIG. 1 illustrates an example of a conventional cache server. A cache server 101 shown in FIG. 1 is connected with client PCs 102a to 102d, constituting an internal network. For example, when the client PC 102d makes a request to connect to a Web page, the cache server 101 judges whether or not data of the requested Web page is cached. Then, if not cached, the cache server 101 connects to the Internet 100. Subsequently, the cache server 101 sends data of the Web page sent from the Internet 100 to the client PC 102d as well as temporarily caches the data of the Web page.

Meantime, when the client PC 102a makes a request to connect to the Web page, the cache server 101 judges whether or not data of the requested Web page is cached. Then, if cached, the cache server 101 does not connect to the Internet 100, but sends the cached data of the Web page to the client PC 102a.

FIG. 2 illustrates an example of cache servers provided in a conventional large-scale computer network. In a large-scale computer network as of a corporation, for example, a cache server is provided for each of the head office and branch offices. Cache servers 103a to 103c shown in FIG. 2 are provided respectively for the head office and branch offices, for example, and are connected with client PCs 104a to 104c, respectively, constituting an internal network. The cache servers 103a to 103c perform a process referred to as a mirroring that synchronizes cache data among the cache servers 103a to 103c so as to have the same cache data.

For example, when the client PC 104a makes a request to connect to a Web page, the cache server 103a judges whether or not data of the requested Web page is cached. Then, if not cached, the cache server 103a connects to the Internet 100. Subsequently, the cache server 103a sends data of the Web page sent from the Internet 100 to the client PC 104a as well as temporarily caches the data of the Web page. Additionally, the cache server 103a performs the mirroring of the cached data of the Web page among the cache servers 103a to 103c.

FIG. 3 illustrates another example of cache servers provided in a conventional large-scale computer network. Cache servers 105a to 105c shown in FIG. 3 are connected with client PCs 106a to 106c, respectively, constituting an internal network. The cache servers 105a to 105c shown in FIG. 3 do not perform the mirroring of data, but each of the cache servers 105a to 105c individually caches data.

For example, the cache server 105a temporarily caches only data of a Web page requested for connection by the client PC 106a. Likewise, the cache servers 105b and 105c temporarily cache only data of Web pages requested for connection by the client PCs 106b and 106c, respectively.

However, the cache servers 103a to 103c shown in FIG. 2 cause the amount of cache data to increase by retaining the same cache data among the cache servers 103a to 103c by mirroring. Therefore, the cache servers 103a to 103c have a problem that a recording medium such as a hard disk suffers a heavy load from the increasing amount of cache data. Additionally, because the amount of cache data remarkably increases, the cache servers 103a to 103c are unable to operate effectively in a large-scale computer network.

On the other hand, the cache servers 105a to 105c shown in FIG. 3 do not perform the mirroring of data, but each of the cache servers 105a to 105c individually caches data. Therefore, the amount of cache data decreases. As a result, there are more cases that the cache servers 105a to 105c have not cached data that is requested for connection by the client PCs 106a to 106c, and thus the cache servers 105a to 105c more often connect to the Internet 100. Therefore, the cache servers 105a to 105c are unable to reduce the traffic of an external network effectively.

SUMMARY OF THE INVENTION

It is a general object of the present invention to provide an improved and useful cache server and a distributed cache server system in which the above-mentioned problems are eliminated.

A more specific object of the present invention is to provide a cache server and a distributed cache server system in which, while the amount of cache data retained by each cache server is decreased, the traffic of an external network can be reduced.

In order to achieve the above-mentioned objects, there is provided according to one aspect of the present invention a cache server provided in an internal network, the cache server comprising:

a cache-data-list table storing information concerning data retained by other cache servers on an individual cache server basis; and a cache-data-list administrating unit receiving a data-inquiry request from one of the other cache servers, and searching the cache-data-list table for cache-server information indicating another one of the other cache servers retaining data regarding the data-inquiry request so as to send the cache-server information to the one of the other cache servers.

According to the present invention, the cache server can administrate information of data retained by other cache servers so that the other cache servers do not have to retain the same data as one another. This reduces the amount of cache data as a whole so as to lessen the task load imposed on a recording medium such as a hard disk. Furthermore, the other cache servers can obtain data from one another so as to alleviate the traffic of an external network.

Additionally, the cache server according to the present invention may further comprise:

a relative-position information table storing information indicating a distance between each two of the other cache servers; and a control-data sending and receiving unit obtaining a distance between the one of the other cache servers and the said another one of the other cache servers from the relative-position information table so as to order the one of the other cache servers to retain the data regarding the data-inquiry request depending on the distance.

Additionally, in the cache server according to the present invention, the control-data sending and receiving unit orders the one of the other cache servers to retain the data regarding the data-inquiry request when the distance is larger than a predetermined distance.

According to the present invention, when one of the other cache servers makes a request to obtain data retained by another cache server that is several cache servers away therefrom, the one of the other cache servers can cache the data in itself so as not to make another request from next time on.

In order to achieve the above-mentioned objects, there is also provided according to another aspect of the present invention a distributed cache server system provided in an internal network, the distributed cache server system comprising:

an owner cache server; and member cache servers, each of which retains data from an external network, and sends information concerning the data to the owner cache server so that the owner cache server stores the information so as to search for cache-server information therefrom indicating one of the member cache servers retaining data regarding a data-obtain request received from within the internal network, wherein, when the owner cache server finds the cache-server information, another one of the member cache servers obtains the data regarding the data-obtain request from the one of the member cache servers, and when the owner cache server does not find the cache-server information, the said another one of the member cache servers obtains the data regarding the data-obtain request from the external network.

Additionally, in the distributed cache server system according to the present invention, the owner cache server may include:

a cache-data-list table storing the information; and a cache-data-list administrating unit receiving a data-inquiry request from another one of the member cache servers, and searching the cache-data-list table for the cache-server information indicating the one of the member cache servers retaining data regarding the data-inquiry request so as to send the cache-server information to the said another one of the member cache servers.

Additionally, in the distributed cache server system according to the present invention, each of the member cache servers may include:

a cache-data DB retaining the data from the external network; and a cache-data sending and receiving unit sending information concerning the data retained from the external network to the owner cache server.

koko

According to the present invention, the owner cache server can administrate information of data retained by member cache servers so that the member cache servers do not have to retain the same data as each other. This reduces the amount of cache data retained in the distributed cache server system so as to lessen the task load imposed on a recording medium such as a hard disk. Furthermore, the member cache servers can obtain data from each other so as to alleviate the traffic with an external network.

Additionally, in the distributed cache server system according to the present invention, the owner cache server may include:

a relative-position information table storing information indicating a distance between each two of the member cache servers; and a control-data sending and receiving unit obtaining a distance between the one of the member cache servers and the said another one of the member cache servers from the relative-position information table so as to order the said another one of the member cache servers to retain the data regarding the data-inquiry request depending on the distance.

According to the present invention, when the said another one of the member cache servers makes a request to obtain data retained by the one of the member cache servers that is several cache servers away therefrom, the said another one of the member cache servers can retain the data in itself so as not to make another request from next time on.

Additionally, in the distributed cache server system according to the present invention, each of the member cache servers may include:

a keyword-information table storing keywords; and a cache-data administrating unit counting a number of times each of the keywords appears in the data obtained from the one of the member cache servers, so that the said another one of the member cache servers retains the data obtained from the one of the member cache servers in the cache-data DB depending on the number of the times.

According to the present invention, when the said another one of the member cache servers makes a request to obtain frequently requested data containing the keywords from the one of the member cache servers, the said another one of the member cache servers can retain the frequently requested data in itself so as not to make another request for the frequently requested data from next time on.

In order to achieve the above-mentioned objects, there is also provided according to another aspect of the present invention a distributed cache server system provided in an internal network, the distributed cache server system comprising:

groups of a cache server and other cache servers, the groups being configured in a hierarchical structure, each of the other cache servers retaining data from an external network, and sending information concerning the data to the owner cache server in each of the groups so that the owner cache server stores the information so as to search for cache-server information therefrom indicating one of the other cache servers retaining data regarding a data-obtain request received from within the internal network, wherein, when the owner cache server finds the cache-server information, another one of the other cache servers in each of the groups obtains the data regarding the data-obtain request from the one of the other cache servers, and when the owner cache server does not find the cache-server information, the said another one of the other cache servers in each of the groups obtains the data regarding the data-obtain request from one of the external network and the others of the groups.

According to the present invention, the cache servers can be configured in a hierarchical structure so that information of cache data retained in the cache servers is administrated effectively according to the hierarchical structure. Consequently, this reduces the amount of cache data retained in the distributed cache server system which then can be applied more effectively in a large-scale computer network.

Other objects, features and advantages of the present invention will become more apparent from the following detailed description when read in conjunction with the accompanying drawings.

BRIEF DESCRIPTION OF THE DRAWINGS

FIG. 8 illustrates a structure of a server-information table;

FIG. 9 illustrates a structure of a cache-data-list table;

FIG. 10 illustrates a structure of a relative-position information table;

FIG. 12 illustrates a structure of a keyword-information table;

FIG. 34 is a flowchart of a cache-data deleting process led by the owner cache-server according to the present embodiment.

DETAILED DESCRIPTION OF THE PREFERRED EMBODIMENTS

A description will now be given, with reference to the drawings, of embodiments according to the present invention. It is noted that, although the description will be given, in the following embodiments, of a computer network receiving data from the Internet as an example, any sort of a computer network is applicable.

Figure 1:
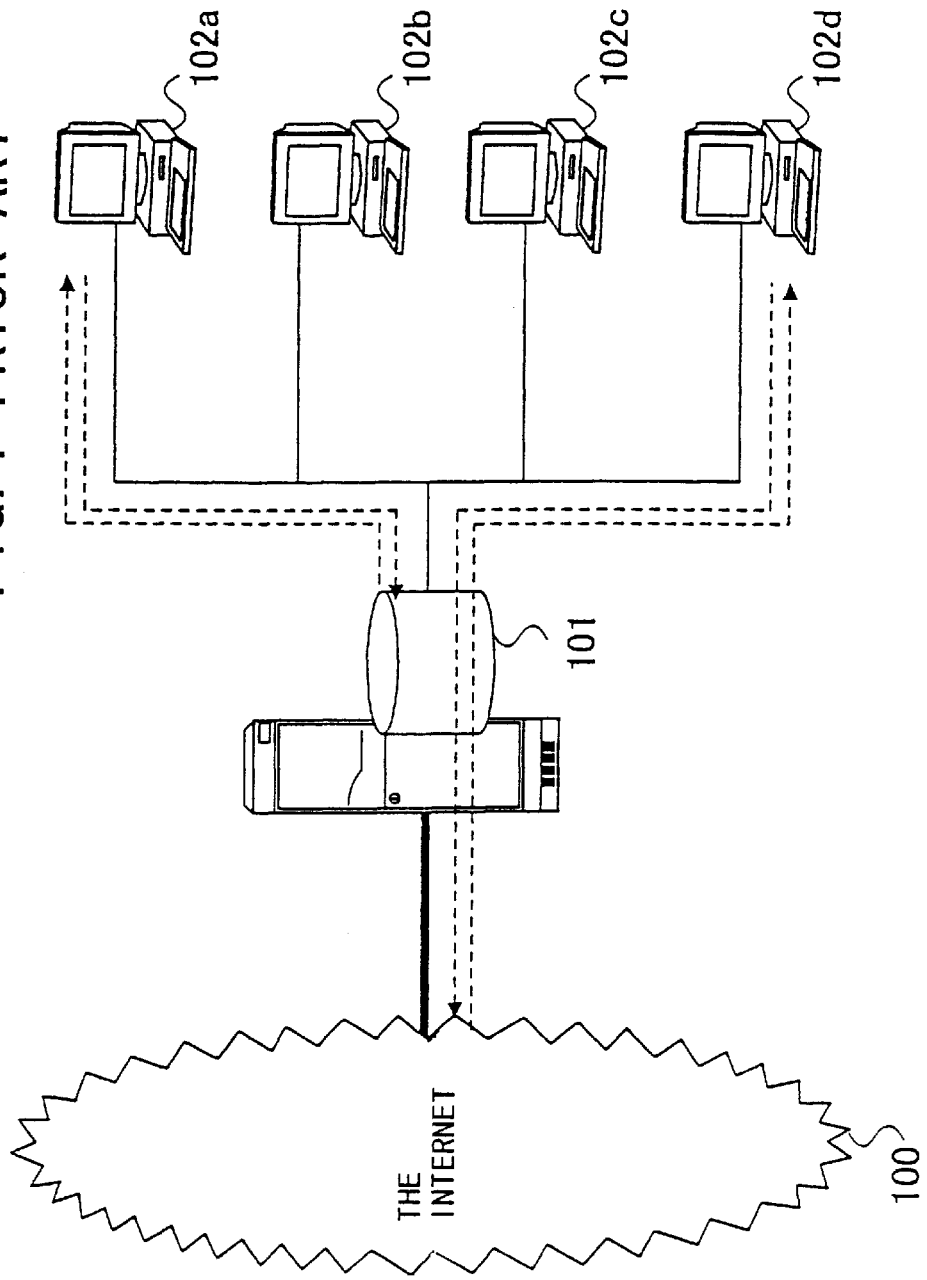
FIG. 1 illustrates an example of a conventional cache server.
Figure 2:
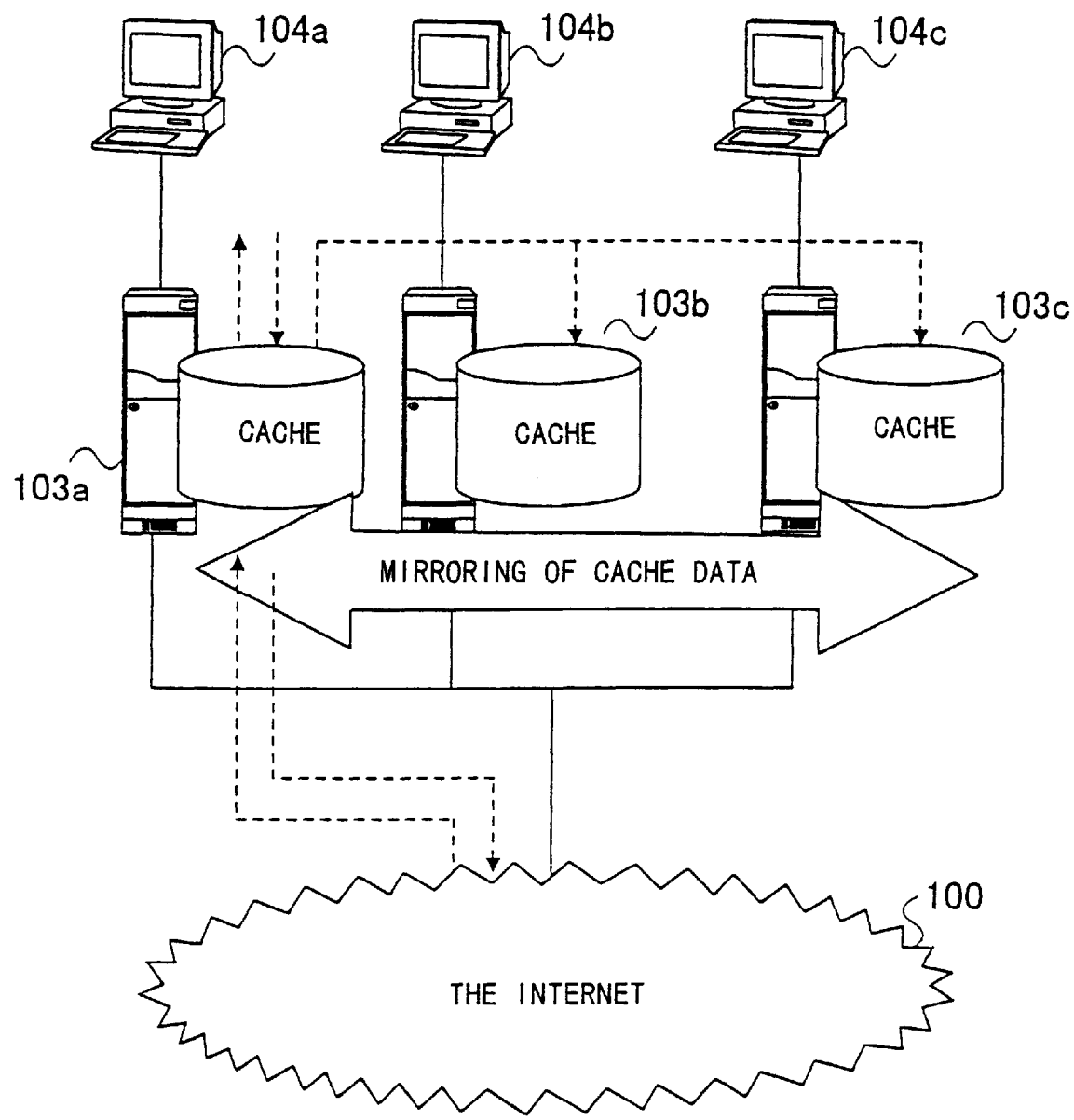
FIG. 2 illustrates an example of cache servers provided in a conventional large-scale computer network.
Figure 3:
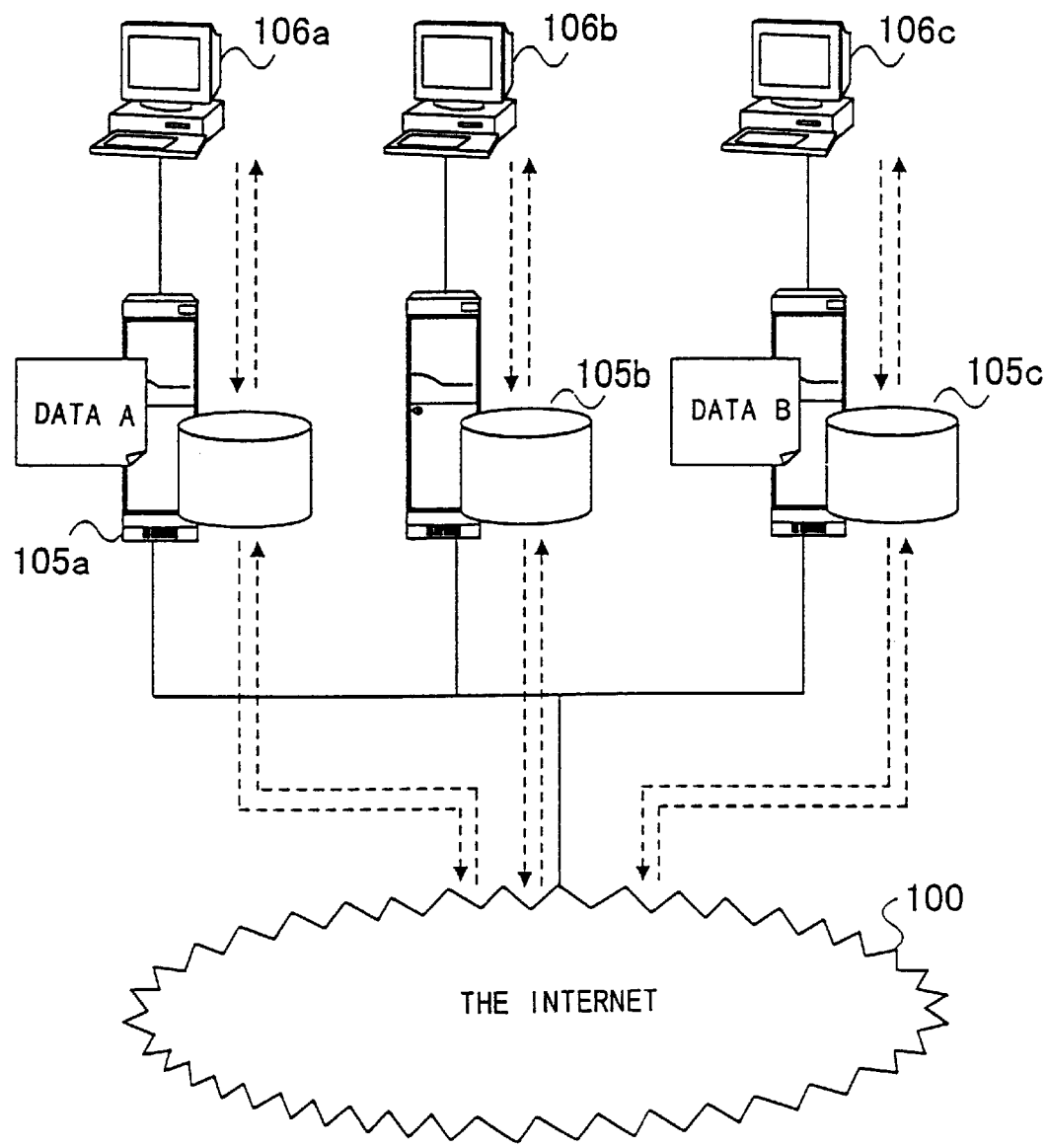
FIG. 3 illustrates another example of cache servers provided in a conventional large-scale computer network.
Figure 4:
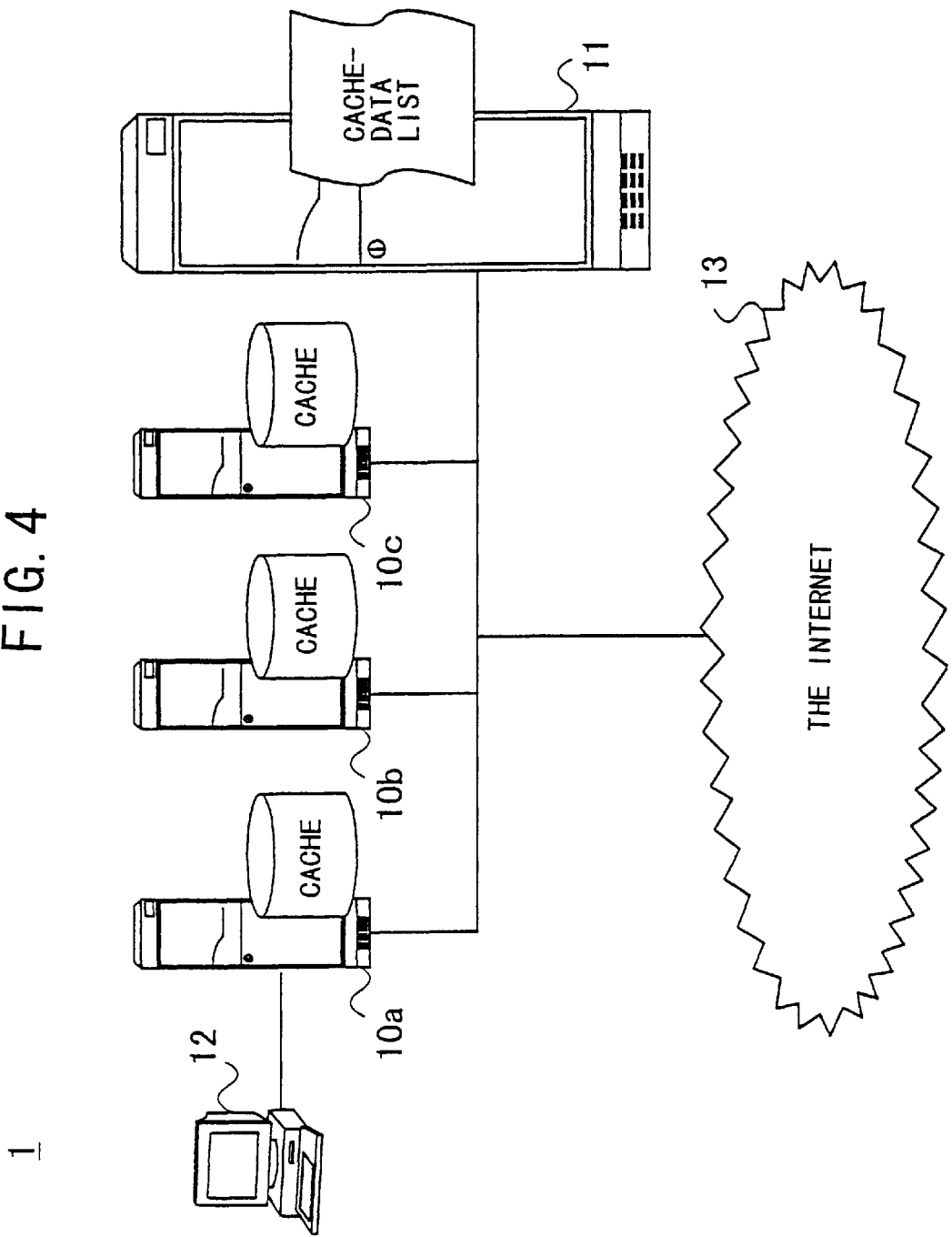
FIG. 4 illustrates a configuration of a distributed cache server system according to an embodiment of the present invention.

FIG. 4 illustrates a configuration of a distributed cache server system according to an embodiment of the present invention. A distributed cache server system 1 comprises member cache-servers 10a to 10c and an owner cache-server 11. The distributed cache server system 1 constitutes an internal network.

The member cache-server 10a is connected with a client PC 12 provided within the internal network. Likewise, the member cache-servers 10b and 10c are connected respectively with a client PC (not shown in the figures) provided within the internal network. The member cache-servers 10a to 10c do not perform the mirroring of data, but each of the member cache-servers 10a to 10c individually caches data.

The owner cache-server 11 is connected with each of the member cache-servers 10a to 10c. The owner cache-server 11 administrates information of cache data retained by the member cache-servers 10a to 10c by using a cache-data list. Besides, the owner cache-server 11 may cache data as the member cache-servers 10a to 10c do.

Figure 5:
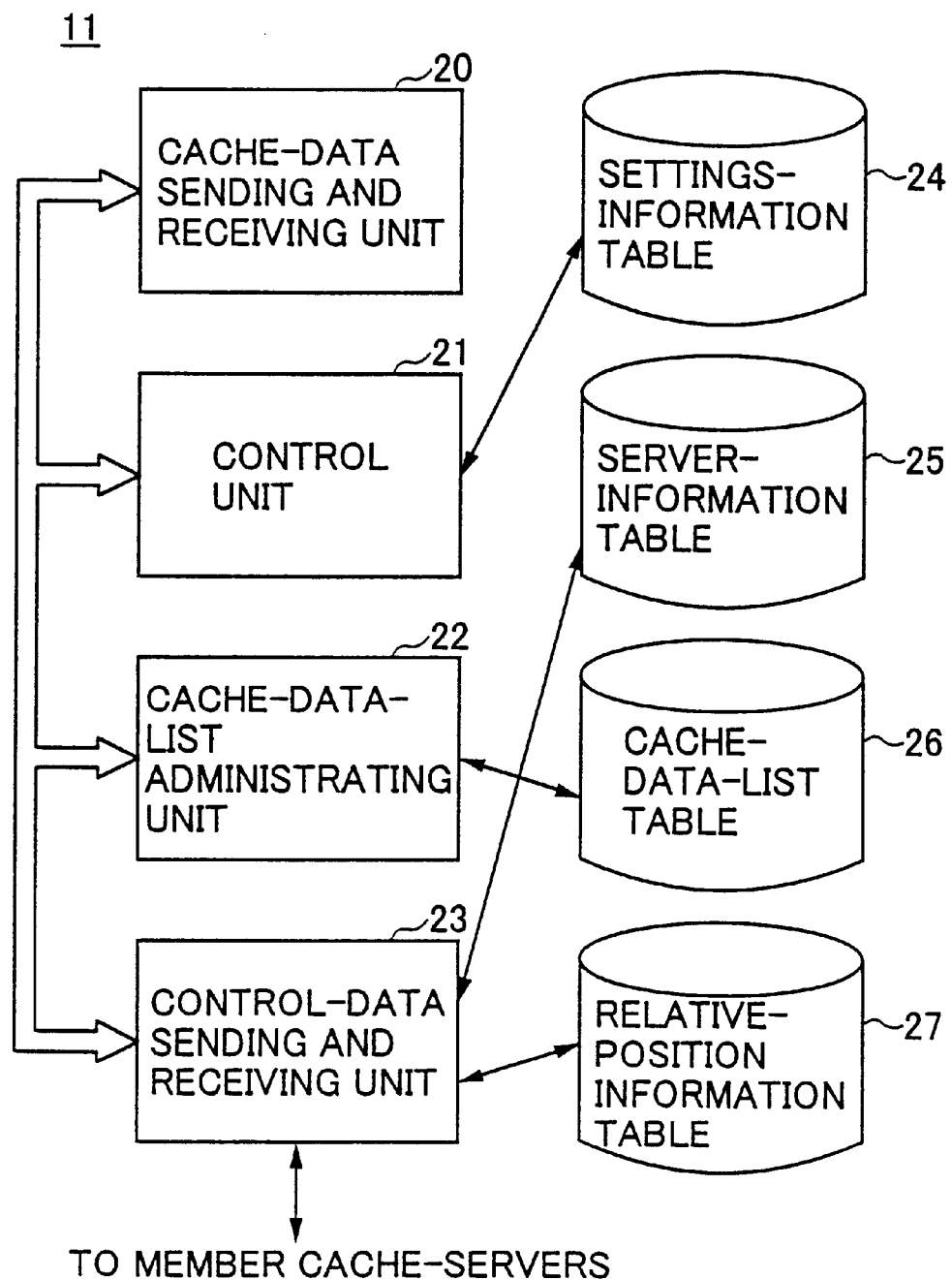
FIG. 5 illustrates a configuration of an owner cache-server according to the present embodiment.

FIG. 5 illustrates a configuration of the owner cache-server 11 according to the present embodiment. The owner cache-server 11 shown in FIG. 5 includes a cache-data sending and receiving unit 20, a control unit 21, a cache-data-list administrating unit 22, a control-data sending and receiving unit 23, a settings-information table 24, a server-information table 25, a cache-data-list table 26, and a relative-position information table 27.

The cache-data sending and receiving unit 20 performs sending and receiving cache data. The control unit 21 controls the entire owner cache-server 11. For example, the control unit 21 controls performances of the cache-data sending and receiving unit 20, the cache-data-list administrating unit 22, and the control-data sending and receiving unit 23.

The cache-data-list administrating unit 22 administrates the cache-data-list table 26, and performs addition, update, deletion, etc. of data to the cache-data-list table 26 in response to requests from the member cache-servers. The control-data sending and receiving unit 23 sends and receives information of a distance between absolute positions of the owner cache-server 11 and each of the member cache-servers, and information of a distance between relative positions of each two of the member cache-servers.

The distance information of absolute positions is stored in the server-information table 25, and is read or written by the control-data sending and receiving unit 23. The distance information of relative positions is stored in the relative-position information table 27, and is read or written by the control-data sending and receiving unit 23.

Figures 6, 7:
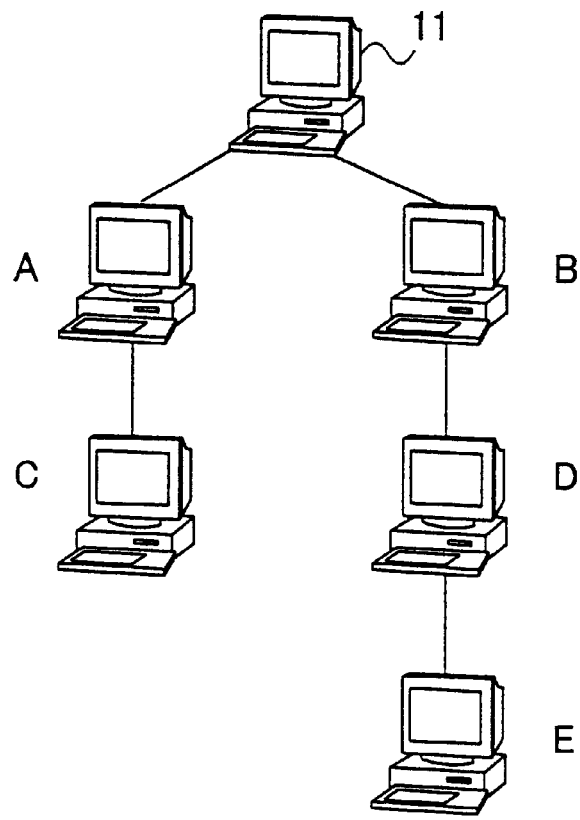
FIG. 6 illustrates a configuration of a settings-information table according to the present embodiment.
FIG. 7 illustrates an example of connection of the owner cache-server and member cache-servers.

The settings-information table 24 contains a distance limit between member cache-servers and a minimum vacant capacity, as shown in FIG. 6. The distance limit between member cache-servers and the minimum vacant capacity will be described in detail hereinafter.

Figure 10:
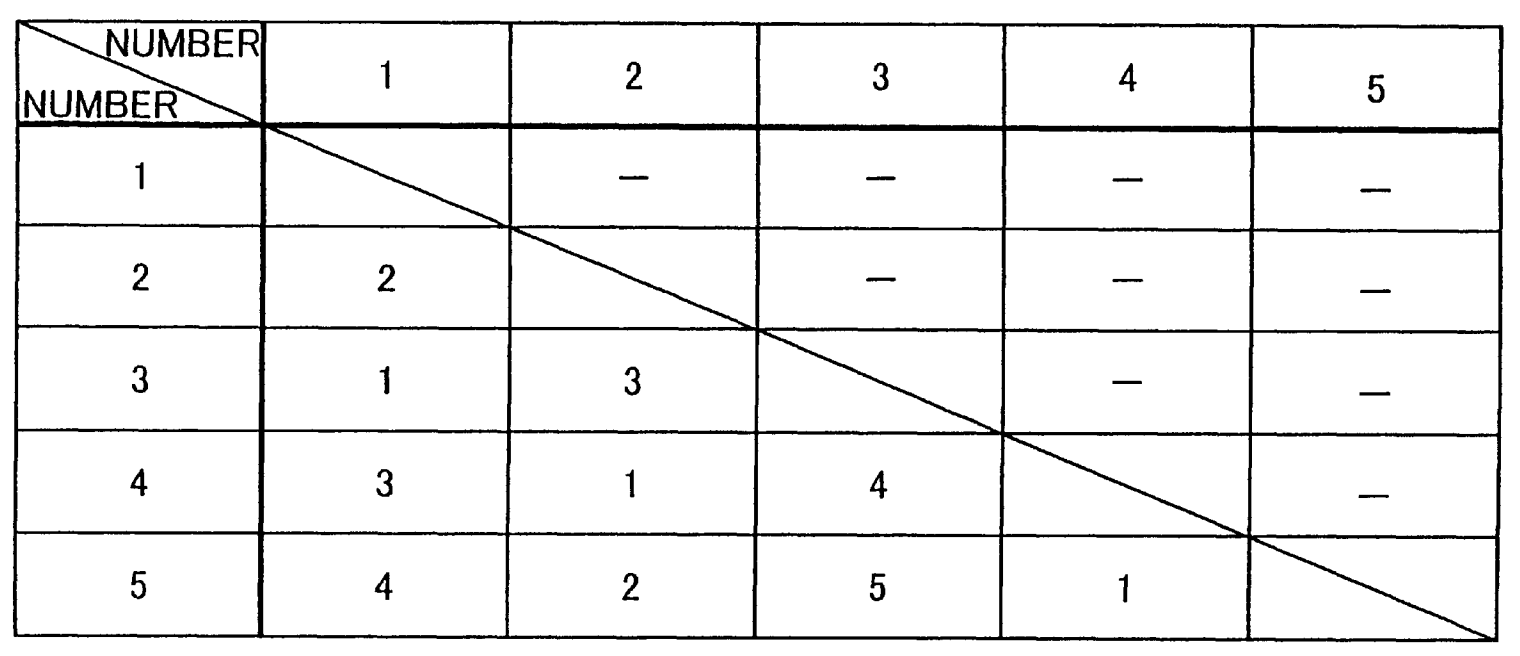

Additionally, when the owner cache-server 11 and member cache-servers A to E are connected as shown in FIG. 7, the server-information table 25, the cache-data-list table 26 and the relative-position information table 27 are structured as shown in FIG. 8, FIG. 9 and FIG. 10, respectively.

FIG. 7 illustrates an example of connection of the owner cache-server and the member cache-servers. The owner cache-server 11 is connected with a series of the member cache-servers A and C, and with a series of the member cache-servers B, D and E.

FIG. 8 illustrates a structure of the server-information table 25. The server-information table 25 contains numbers, member-cache-server names, IP addresses, proxy names, and level numbers, as shown in FIG. 8. The numbers correspond uniquely to the member cache-servers A to E, that is, the member cache-servers A to E are related to numbers 1 to 5, respectively.

The member-cache-server names are names of the member cache-servers, and correspond to the member cache-servers A to E shown in FIG. 7. The IP addresses are IP addresses of the member cache-servers A to E. The proxy names are proxy names of the member cache-servers A to E. The level numbers are numbers of levels from the owner cache-server 11 to each of the member cache-servers, and for example, "3" is set for the level number of the member cache-server E.

FIG. 9 illustrates a structure of the cache-data-list table 26. The cache-data-list table 26 contains retained URLs (uniform resource locators), retaining server numbers, data creation dates, and related data. The retained URLs are URLs of cache data retained in the member cache-servers A to E. The retaining server numbers are server numbers of the member cache-servers retaining the cache data of the retained URLs, and correspond to the numbers of the server-information table 25 shown in FIG. 8. The data creation dates are dates when the cache data of the retained URLs are created. Additionally, the data creation dates may include the times. The related data is data related to the retained URLs.

FIG. 10 illustrates a structure of the relative-position information table 27. The relative-position information table 27 contains numbers of levels (distances) between each two of the member cache-servers A to E. For example, "3" set in the third row of the second column represents the number of levels between the member cache-server A corresponding to the number 1 and the member cache-server B corresponding to the number 2. Likewise, "5" set in the sixth row of the fourth column represents the number of levels between the member cache-server C corresponding to the number 3 and the member cache-server E corresponding to the number 5.

Figure 11:
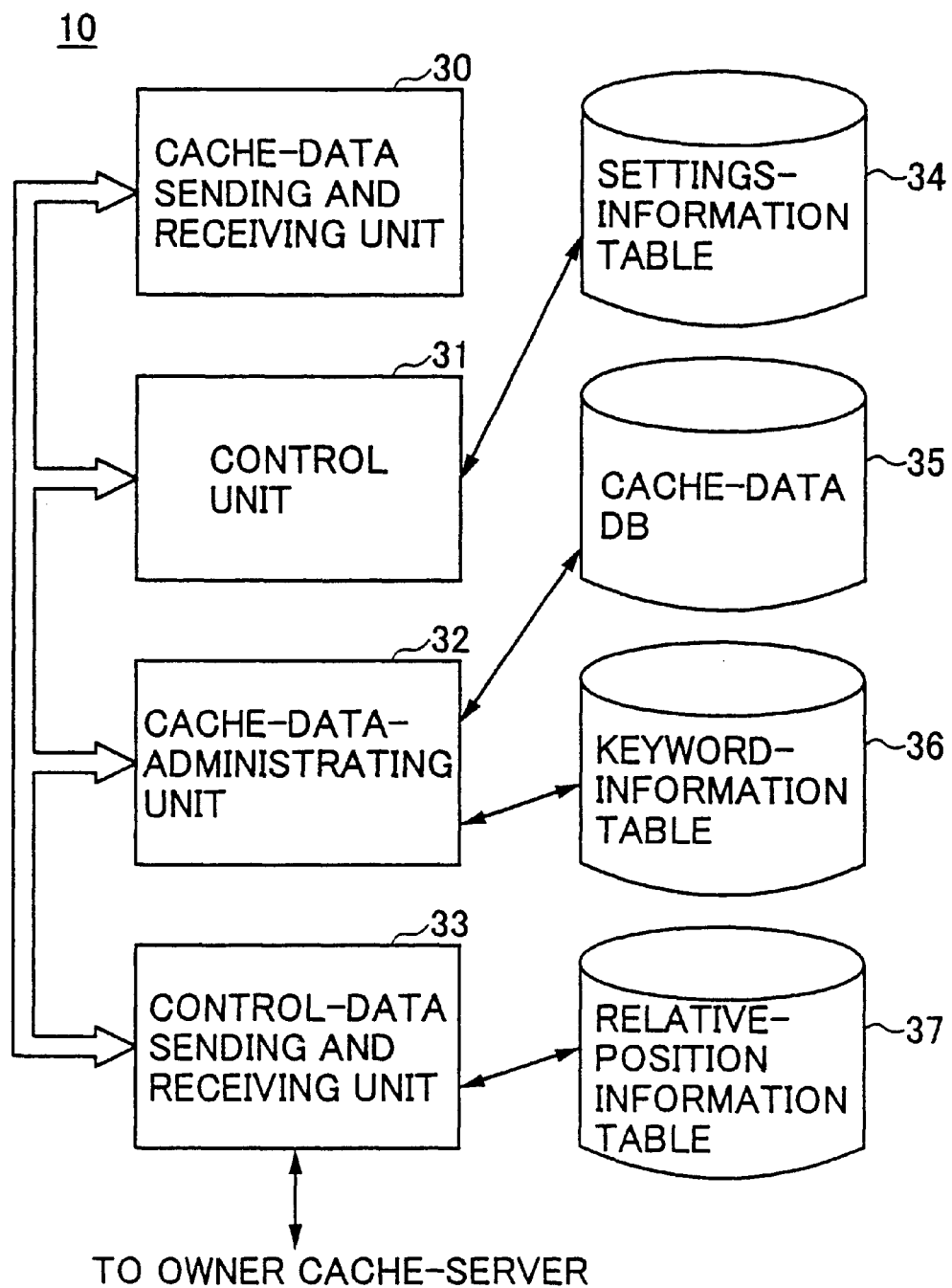
FIG. 11 illustrates a configuration of each of the member cache-servers according to the present embodiment.

FIG. 11 illustrates a configuration of each of the member cache-servers according to the present embodiment. A member cache-server 10 shown in FIG. 11 includes a cache-data sending and receiving unit 30, a control unit 31, a cache-data administrating unit 32, a control-data sending and receiving unit 33, a settings-information table 34, a cache-data DB 35, a keyword-information table 36, and a relative-position information table 37.

It is noted that the cache-data sending and receiving unit 30, the control unit 31, the control-data sending and receiving unit 33, the settings-information table 34, the relative-position information table 37 are identical to the cache-data sending and receiving unit 20, the control unit 21, the control-data sending and receiving unit 23, the settings-information table 24, the relative-position information table 27 of the owner cache-server 11, respectively, and will not be described in detail.

The cache-data administrating unit 32 administrates the cache-data DB 35, and performs addition, update, deletion, etc. of cache data to the cache-data DB 35. The cache-data DB 35 stores data of, for example, a Web page as cache data. The keyword-information table 36 contains keywords and frequencies of appearances, as shown in FIG. 12. The above-mentioned cache-data administrating unit 32 counts the number of times each of the keywords appears in received cache data. The keywords and the frequencies of appearances will be described in detail hereinafter.

Hereinbelow, a description will be given, with reference to sequence diagrams and flowcharts, of process procedures of the distributed cache server system 1 according to the present invention. It is noted that, in the sequence diagrams described hereinbelow, an "owner" represents the owner cache-server 11, a "member A" represents the member cache-server 10a, a "member B" represents the member cache-server 10b, a "member C" represents the member cache-server 10c, and a "PC under member A" represents the client PC 12.

Figure 13:
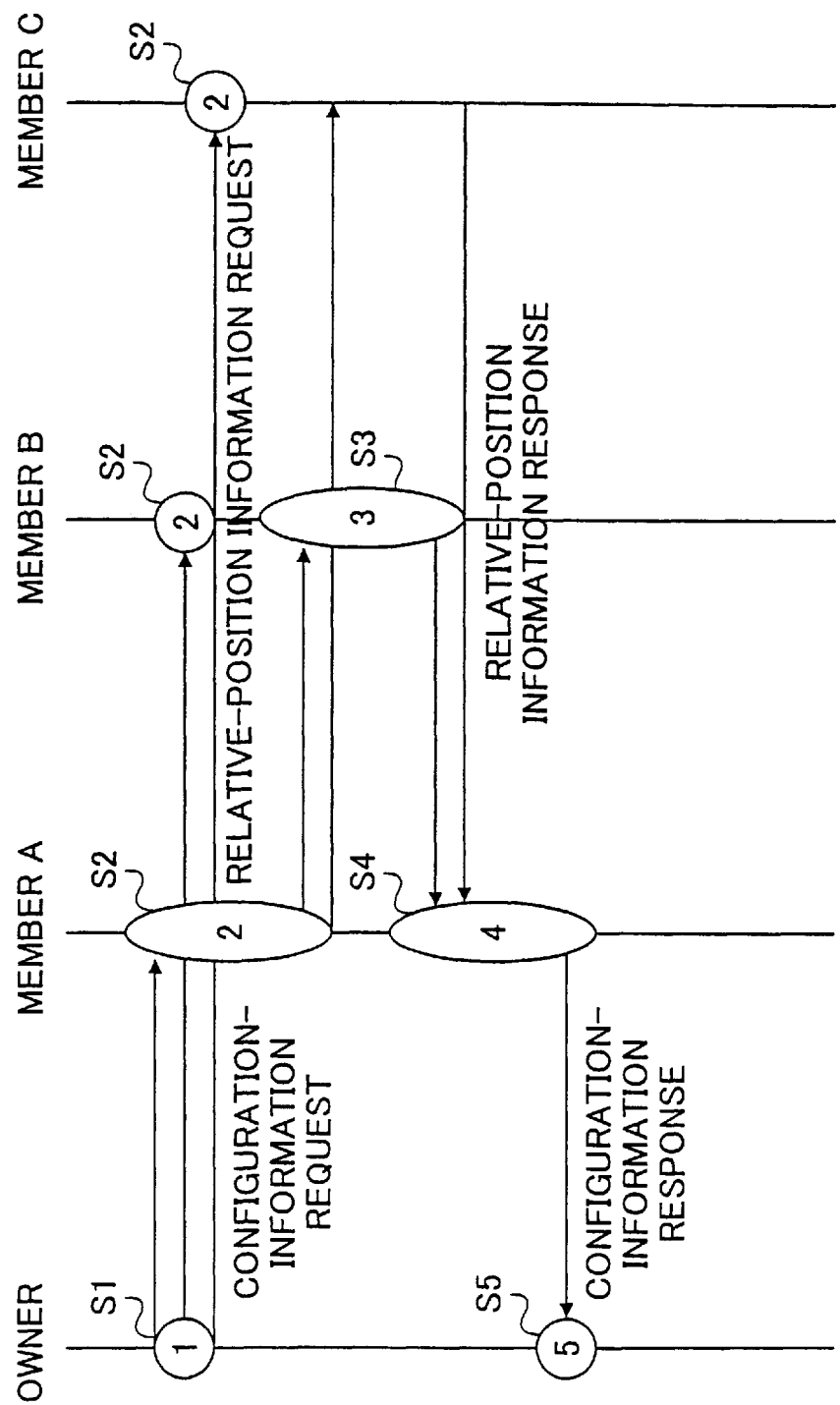
FIG. 13 is a sequence diagram of a process of automatically recognizing a system configuration.
Figure 14:
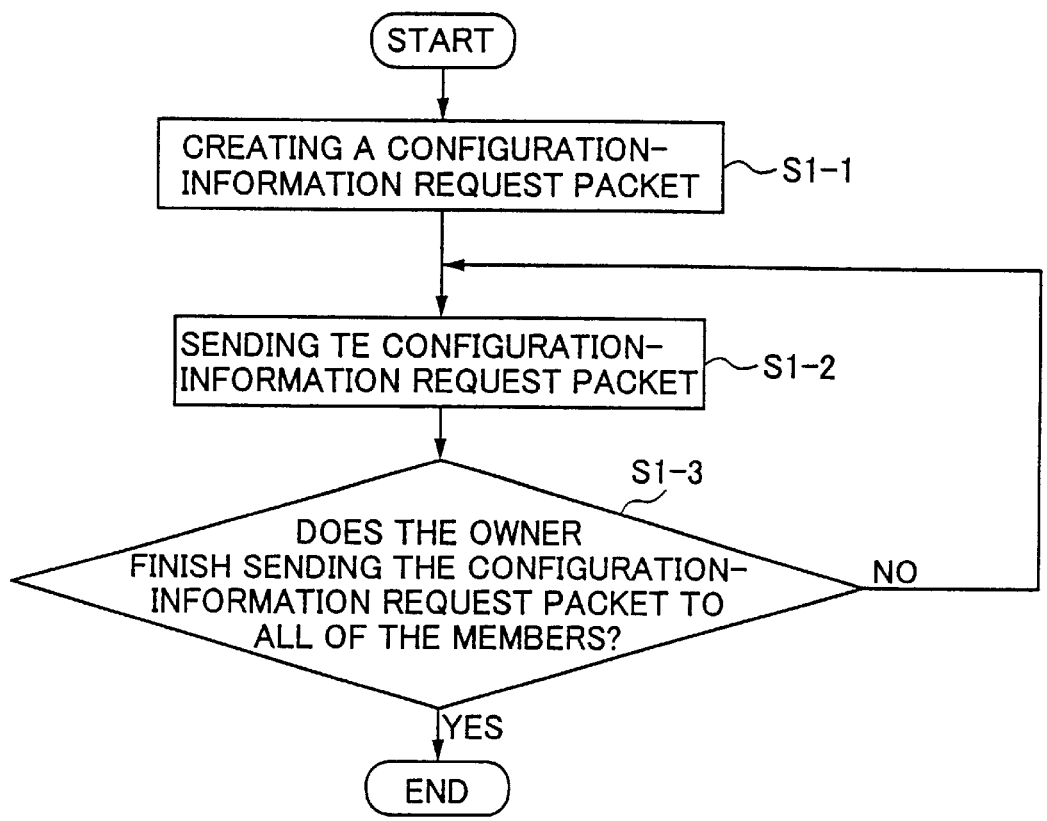
FIG. 14 is a flowchart of steps of creating and sending a configuration-information request according to the present embodiment.

FIG. 13 is a sequence diagram of a process of automatically recognizing a system configuration. In FIG. 13, the owner cache-server 11 performs a step S1 of creating and sending a configuration-information request, the step being started at any given time. FIG. 14 is a flowchart of the step S1 of creating and sending the configuration-information request according to the present embodiment.

In a step S1-1, the owner cache-server 11 creates a configuration-information request packet. Subsequently, in a step S1-2, the owner cache-server 11 sends the configuration-information request packet to any one of the member cache-servers 10a to 10c.

Subsequently, in a step S1-3, the owner cache-server 11 judges whether or not the owner cache-server 11 finishes sending the configuration-information request packet to all of the member cache-servers 10a to 10c. If the owner cache-server 11 judges that the owner cache-server 11 does not finish sending the configuration-information request packet to all of the member cache-servers 10a to 10c (NO in the step S1-3 in FIG. 14), the procedure returns to the step S1-2 so that the owner cache-server 11 performs the step S1-2 again. On the other hand, if the owner cache-server 11 judges that the owner cache-server 11 finishes sending the configuration-information request packet to all of the member cache-servers 10a to 10c (YES in the step S1-3 in FIG. 14), the owner cache-server 11 ends the step S1 of creating and sending the configuration-information request.

Figure 15:
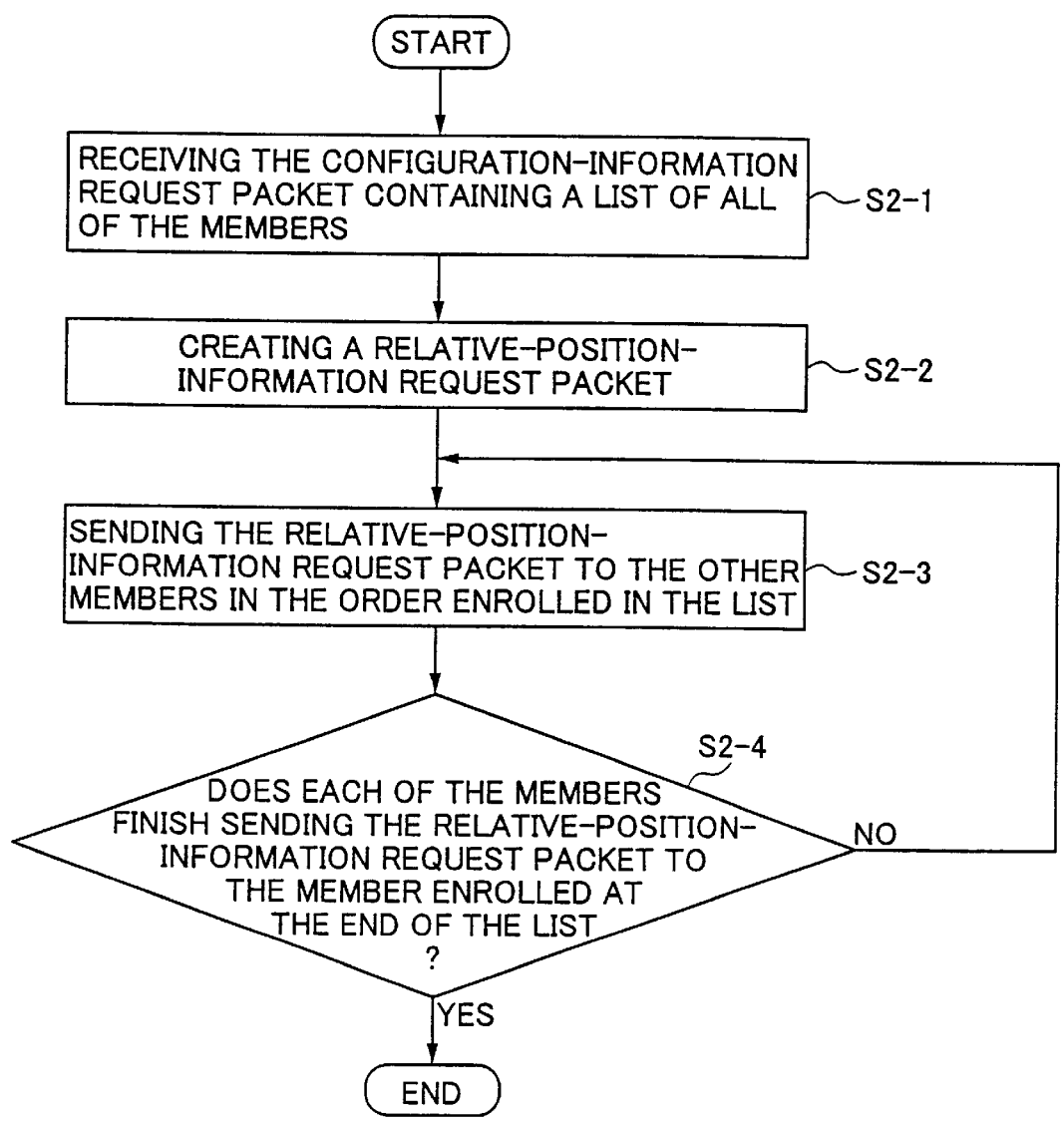
FIG. 15 is a flowchart of steps of creating and sending a relative-position-information request according to the present embodiment.

In FIG. 13, each of the member cache-servers 10a to 10c performs a step S2 of creating and sending a relative-position-information request after receiving the configuration-information request packet. FIG. 15 is a flowchart of the step S2 of creating and sending the relative-position-information request according to the present embodiment.

In a step S2-1, each of the member cache-servers 10a to 10c receives the configuration-information request packet. The configuration-information request packet contains a list of all of the member cache-servers 10a to 10c. Subsequently, in a step S2-2, each of the member cache-servers 10a to 10c creates a relative-position-information request packet used to obtain distances or numbers of levels from the others of the member cache-servers 10a to 10c.

Subsequently, in a step S2-3, each of the member cache-servers 10a to 10c sends the relative-position-information request packet to the others of the member cache-servers 10a to 10c in the order enrolled in the list.

Subsequently, in a step S2-4, each of the member cache-servers 10a to 10c judges whether or not each of the member cache-servers 10a to 10c finishes sending the relative-position-information request packet to the member cache-server enrolled at the end of the list. If each of the member cache-servers 10a to 10c judges that each of the member cache-servers 10a to 10c does not finish sending the relative-position-information request packet to the member cache-server enrolled at the end of the list (NO in the step S2-4 in FIG. 15), the procedure returns to the step S2-3 so that each of the member cache-servers 10a to 10c performs the step S2-3 again. On the other hand, if each of the member cache-servers 10a to 10c judges that each of the member cache-servers 10a to 10c finishes sending the relative-position-information request packet to the member cache-server enrolled at the end of the list (YES in the step S2-4 in FIG. 15), each of the member cache-servers 10a to 10c ends the step S2 of creating and sending the relative-position-information request. It is noted that, for convenience' sake in explanation, FIG. 13 denotes the relative-position-information request packet sent from the member cache-server 10a.

Figure 16:
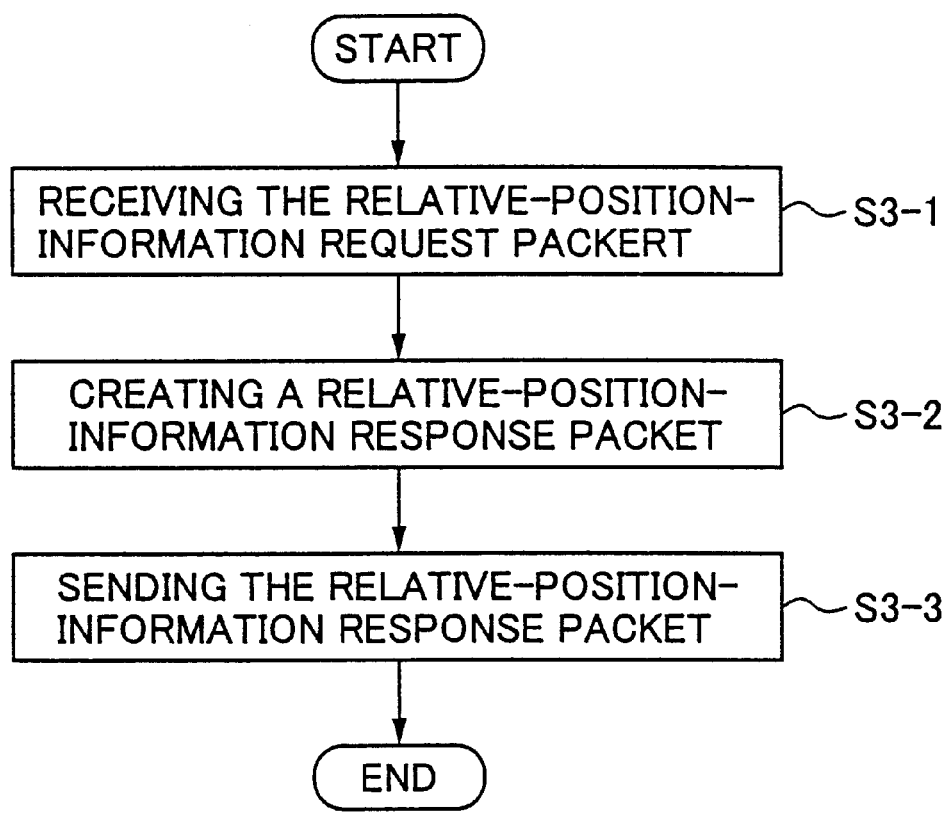
FIG. 16 is a flowchart of steps of creating and sending a relative-position-information response according to the present embodiment.

In FIG. 13, each of the member cache-servers 10a to 10c performs a step S3 of creating and sending a relative-position-information response after receiving the relative-position-information request packet. FIG. 16 is a flowchart of the step S3 of creating and sending the relative-position-information response according to the present embodiment.

In a step S3-1, each of the member cache-servers 10a to 10c receives the relative-position-information request packet. Subsequently, in a step S3-2, each of the member cache-servers 10a to 10c creates a relative-position-information response packet based on the relative-position-information request packet. Subsequently, in a step S3-3, each of the member cache-servers 10a to 10c sends the relative-position-information response packet to the member cache-server that has sent the relative-position-information request packet.

Figure 17:
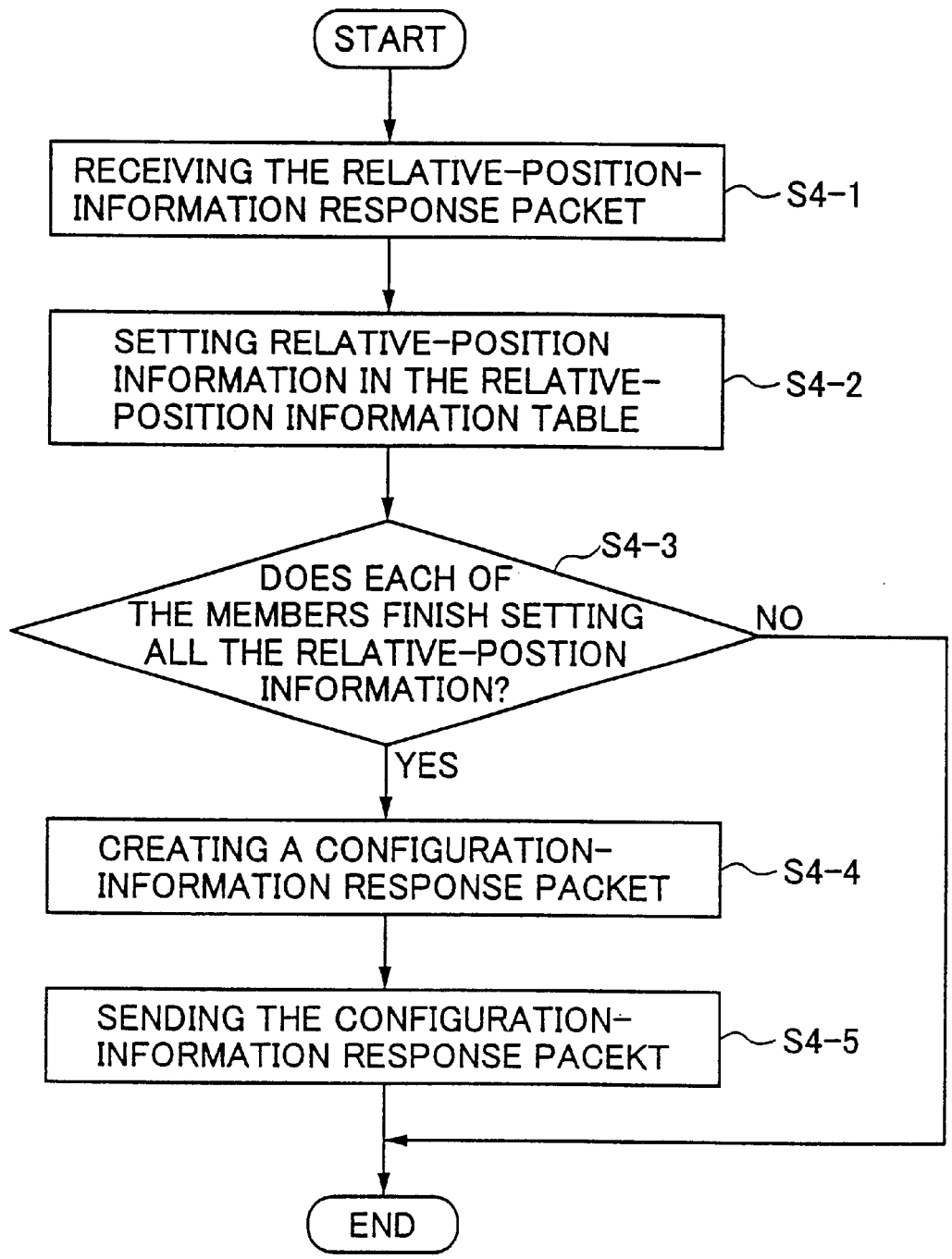
FIG. 17 is a flowchart of steps of creating and sending a configuration-information response according to the present embodiment.

In FIG. 13, each of the member cache-servers 10a to 10c performs a step S4 of creating and sending a configuration-information response after receiving the relative-position-information response packet. FIG. 17 is a flowchart of the step S4 of creating and sending the configuration-information response according to the present embodiment.

In a step S4-1, each of the member cache-servers 10a to 10c receives the relative-position-information response packet from each of the others of the member cache-servers 10a to 10c.

Subsequently, in a step S4-2, each of the member cache-servers 10a to 10c sets relative-position information in the relative-position information table 37 shown in FIG. 11 (and FIG. 10) according to TTL (time to live) information included in an IP header of the relative-position-information response packet. The relative-position information being set is the number of levels from the others of the member cache-servers 10a to 10c.

Subsequently, in a step S4-3, each of the member cache-servers 10a to 10c judges whether or not each of the member cache-servers 10a to 10c finishes setting all the relative-position information from the others of the member cache-servers 10a to 10c. If each of the member cache-servers 10a to 10c judges that each of the member cache-servers 10a to 10c finishes setting all the relative-position information from the others of the member cache-servers 10a to 10c (YES in the step S4-3 in FIG. 17), the procedure advances to a step S4-4. On the other hand, if each of the member cache-servers 10a to 10c judges that each of the member cache-servers 10a to 10c does not finish setting all the relative-position information from the others of the member cache-servers 10a to 10c (NO in the step S4-3 in FIG. 17), each of the member cache-servers 10a to 10c ends the step S4 of creating and sending the configuration-information response.

In the step S4-4, each of the member cache-servers 10a to 10c creates a configuration-information response packet based on the relative-position information. Subsequently, in a step S4-5, each of the member cache-servers 10a to 10c sends the configuration-information response packet to the owner cache-server 11.

Figure 18:
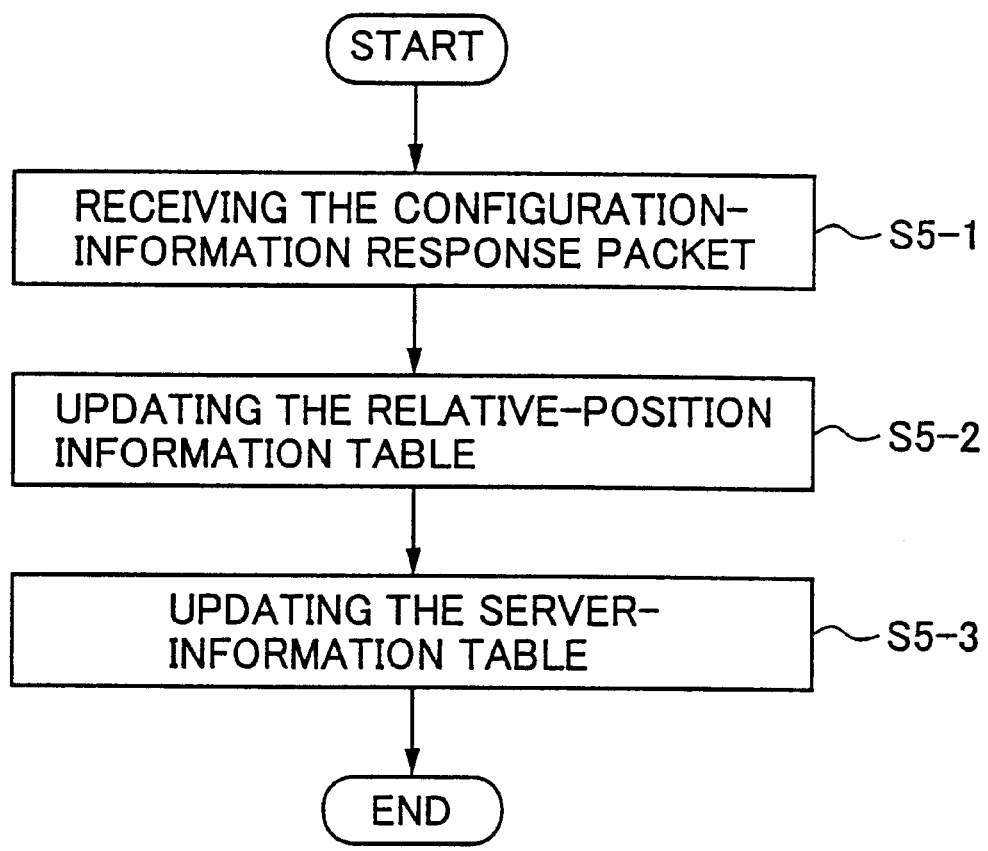
FIG. 18 is a flowchart of steps of updating information tables according to the present embodiment.

In FIG. 13, the owner cache-server 11 performs a step S5 of updating information tables after receiving the configuration-information response packet. FIG. 18 is a flowchart of the step S5 of updating information tables according to the present embodiment.

In a step S5-1, the owner cache-server 11 receives the configuration-information response packet from all of the member cache-servers 10a to 10c. Subsequently, in a step S5-2, the owner cache-server 11 sets or updates relative-position information in the relative-position information table 27 shown in FIG. 5 and FIG. 10 according to the configuration-information response packet.

Subsequently, in a step S5-3, the owner cache-server 11 sets or updates the level numbers in the server-information table 25 shown in FIG. 5 and FIG. 8 according to the configuration-information response packet. The level numbers of the server-information table 25 are numbers of levels (absolute positions) from the owner cache-server 11 to each of the member cache-servers 10*a* to 10*c*.

Figure 19:
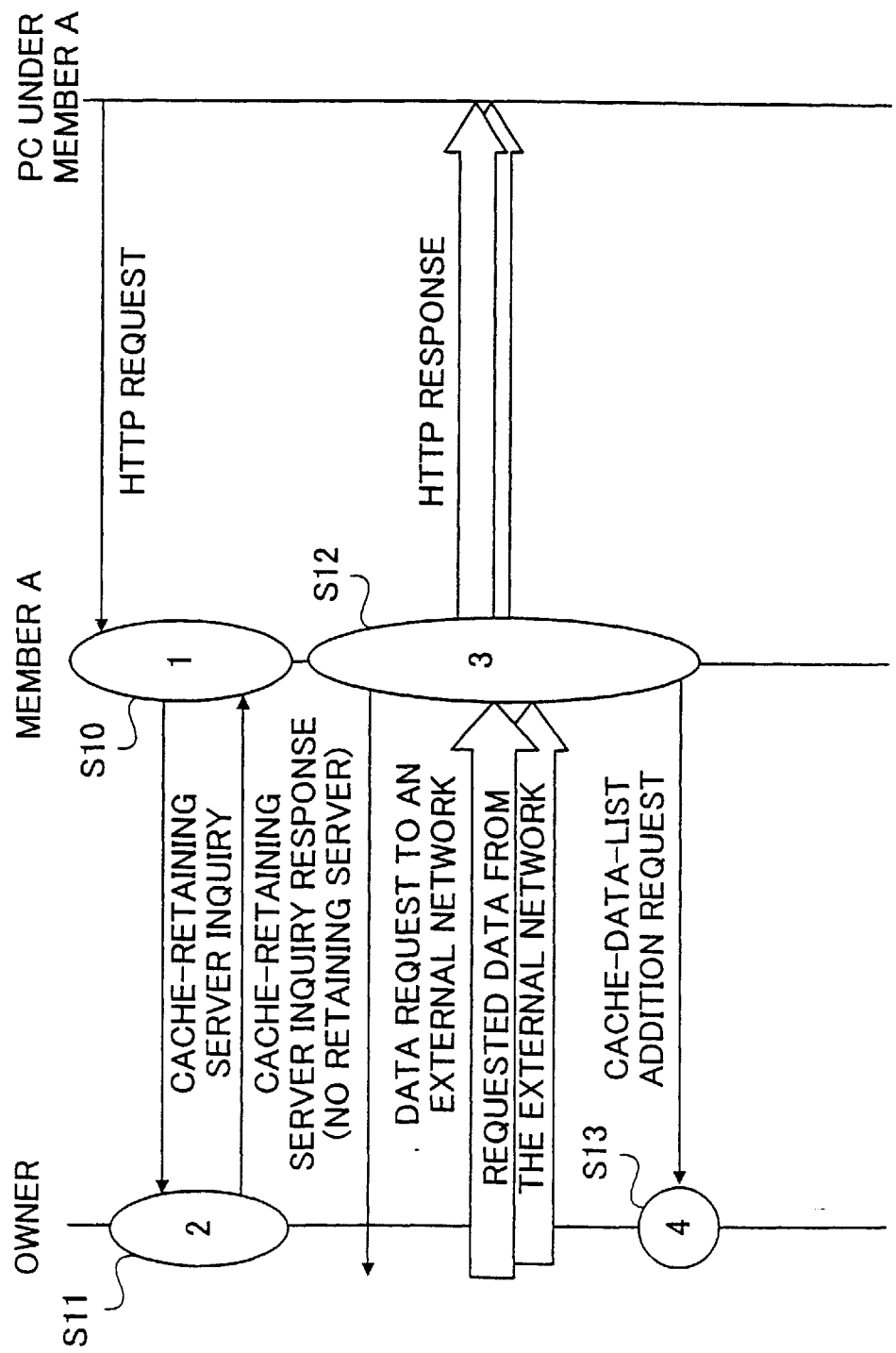
FIG. 19 is a sequence diagram of a process in a case of requested data not existing in the distributed cache server system.

Next, a description will be given of a process in a case where the client PC 12 makes a request to obtain data that does not exist in the distributed cache server system 1. FIG. 19 is a sequence diagram of the process in the case of requested data not existing in the distributed cache server system 1.

In a step S10 indicated in FIG. 19, the member cache-server 10*a* receives an HTTP request as a data-obtain request from the client PC 12, and then, if the requested data is not cached in the cache-data DB 35 of its own (i.e., of the member cache-server 10*a*), performs the step S10 of inquiring a cache-retaining server.

Figure 20:
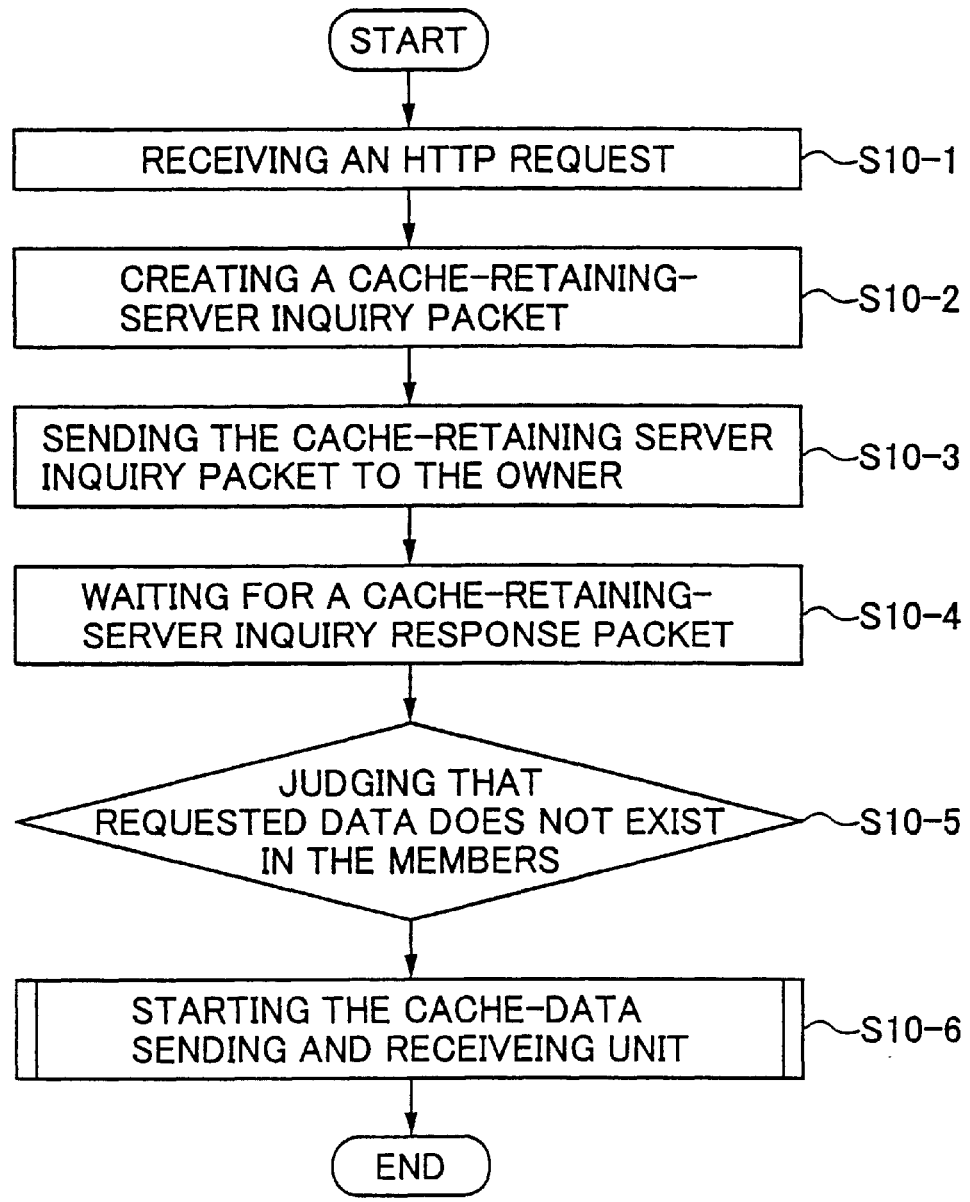
FIG. 20 is a flowchart of steps of inquiring a cache-retaining server according to the present embodiment.

FIG. 20 is a flowchart of the step S10 of inquiring a cache-retaining server according to the present embodiment. In a step S10-1, the member cache-server 10*a* receives an HTTP request as a data-obtain request from the client PC 12. Subsequently, in a step S10-2, the member cache-server 10*a* creates a cache-retaining-server inquiry packet, if the requested data is not cached in the cache-data DB 35 of its own (i.e., of the member cache-server 10*a*).

Subsequently, in a step S10-3, the member cache-server 10*a* sends the cache-retaining-server inquiry packet to the owner cache-server 11. Subsequently, in a step S10-4, the member cache-server 10*a* waits until the member cache-server 10*a* receives a cache-retaining-server inquiry response packet from the owner cache-server 11.

When the member cache-server 10*a* receives the cache-retaining-server inquiry response packet from the owner cache-server 11, the member cache-server 10*a* performs a step S10-5 next. In the step S10-5, the member cache-server 10*a* references the cache-retaining-server inquiry response packet so as to judge whether or not the requested data exists in the member cache-servers 10*b* and 10*c* of the distributed cache server system 1.

Since the sequence diagram shown in FIG. 19 is of the process in the case of requested data not existing in the distributed cache server system 1, the member cache-server 10*a* judges that the requested data does not exist in the member cache-servers 10*b* and 10*c* of the distributed cache server system 1. Subsequently, in a step S10-6, the member cache-server 10*a* starts the cache-data sending and receiving unit 30 so as to obtain the requested data from the Internet 13.

Figure 21:
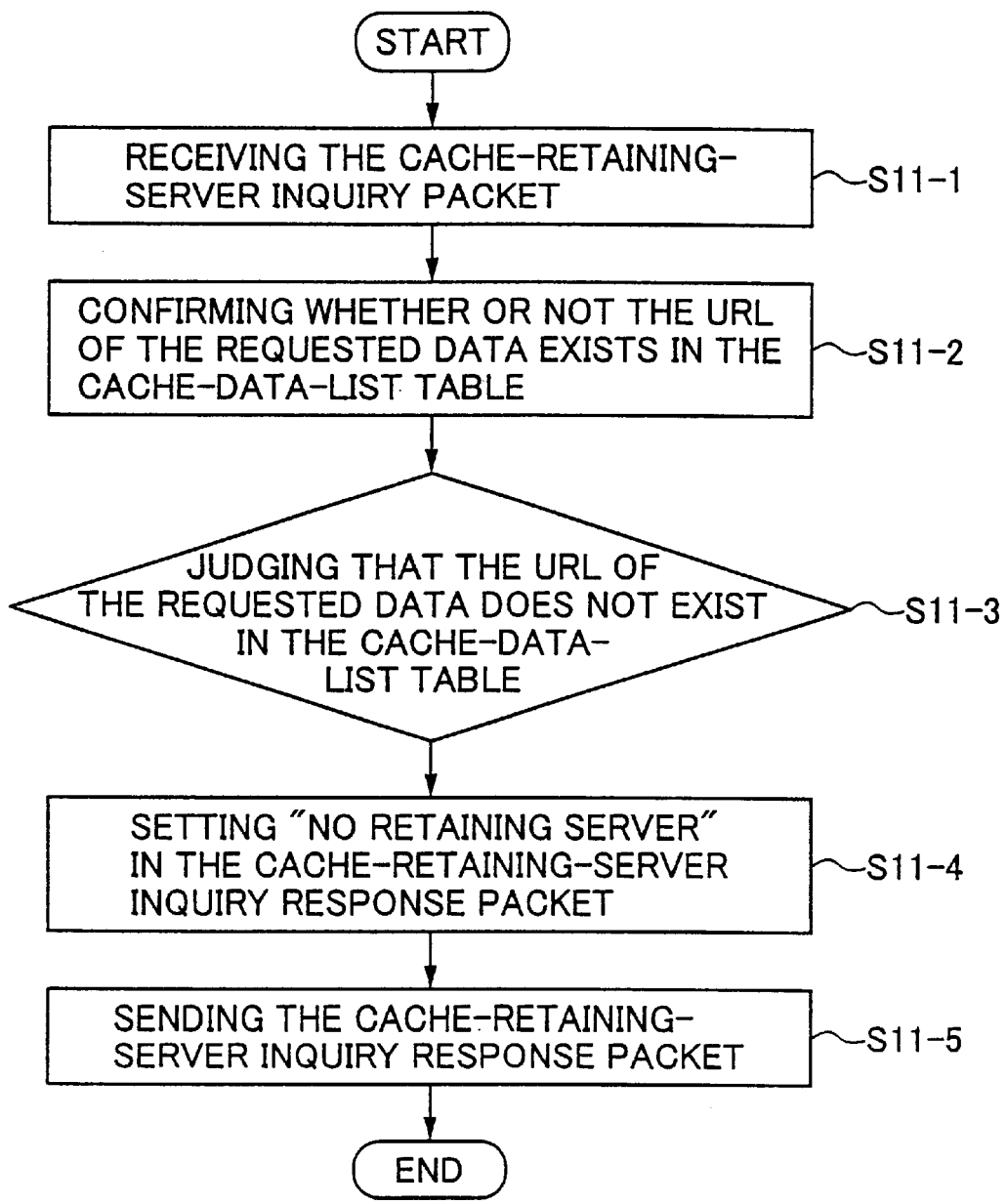
FIG. 21 is a flowchart of steps of creating and sending a cache-retaining-server inquiry response according to the present embodiment.

In FIG. 19, the owner cache-server 11 performs a step S11 of creating and sending a cache-retaining-server inquiry response after receiving the cache-retaining-server inquiry packet from the member cache-server 10*a*. FIG. 21 is a flowchart of the step S11 of creating and sending the cache-retaining-server inquiry response according to the present embodiment.

In a step S11-1, the owner cache-server 11 receives the cache-retaining-server inquiry packet from the member cache-server 10*a*. Subsequently, in a step S11-2, the owner cache-server 11 references the cache-retaining-server inquiry packet, and confirms whether or not the requested data exists in the cache-data-list table 26.

Subsequently, in a step S11-3, the owner cache-server 11 judges whether or not the requested data exists in the cache-data-list table 26. Since the sequence diagram shown in FIG. 19 is of the process in the case of requested data not existing in the distributed cache server system 1, the owner cache-server 11 judges that the requested data does not exist in the cache-data-list table 26.

Subsequently, in a step S11-4, the owner cache-server 11 sets "no retaining server" in the cache-retaining-server inquiry response packet, "no retaining server" meaning that the requested data does not exist in the member cache-servers 10*b* and 10*c* of the distributed cache server system 1. Subsequently, in a step S11-5, the owner cache-server 11 sends the cache-retaining-server inquiry response packet to the member cache-server 10*a*.

Figure 22:
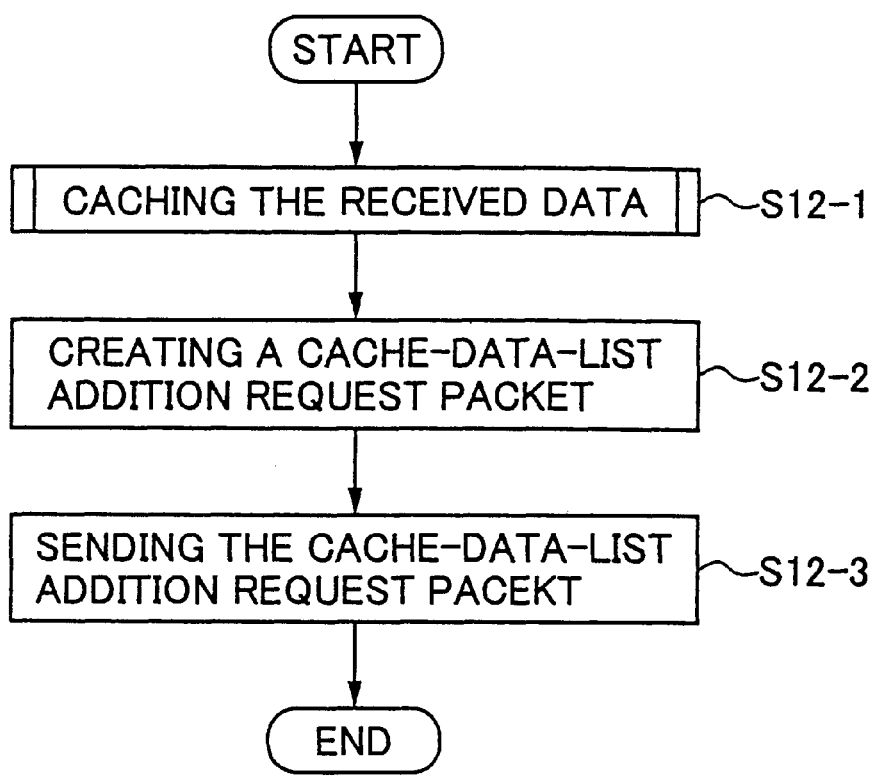
FIG. 22 is a flowchart of steps of caching the received data according to the present embodiment.

In FIG. 19, after receiving the requested data from the Internet 13, the member cache-server 10*a* performs a step S12 of caching the received data. FIG. 22 is a flowchart of the step S12 of caching the received data according to the present embodiment.

In a step S12-1, the member cache-server 10*a* receives the requested data from the Internet 13, and then caches the received data in the cache-data DB 35. Subsequently, in a step S12-2, the member cache-server 10*a* cerates a cache-data-list addition request packet according to the cached data. Subsequently, in a step S12-3, the member cache-server 10*a* sends the cache-data-list addition request packet to the owner cache-server 11.

Figure 23:
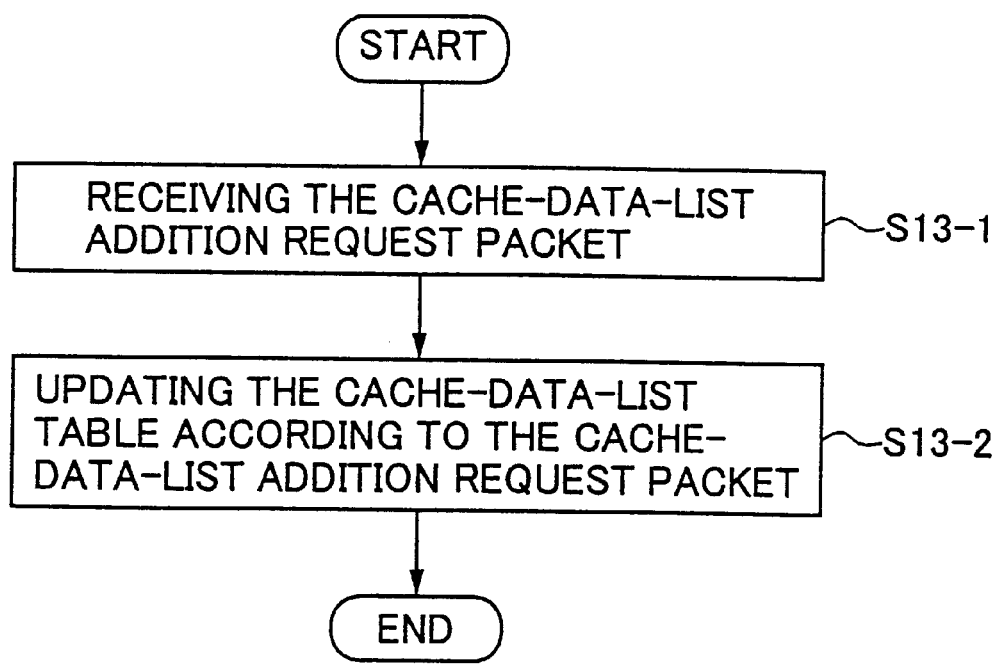
FIG. 23 is a flowchart of steps of updating the cache-data list according to the present embodiment.

In FIG. 19, the owner cache-server 11 performs a step S13 of updating the cache-data list after receiving the cache-data-list addition request packet. FIG. 23 is a flowchart of the step S13 of updating the cache-data list according to the present embodiment.

In a step S13-1, the owner cache-server 11 receives the cache-data-list addition request packet from the member cache-server 10*a*. Subsequently, in a step S13-2, the owner cache-server 11 updates the cache-data-list table 26 shown in FIG. 5 and FIG. 9 according to the cache-data-list addition request packet. For example, the cache-data-list table 26 has the following items added: a URL of the data received from the Internet 13 (the retained URL); the number of the member cache-server 10*a* caching the received data (the retaining server number); and the data creation date when the received data is cached.

Figure 24:
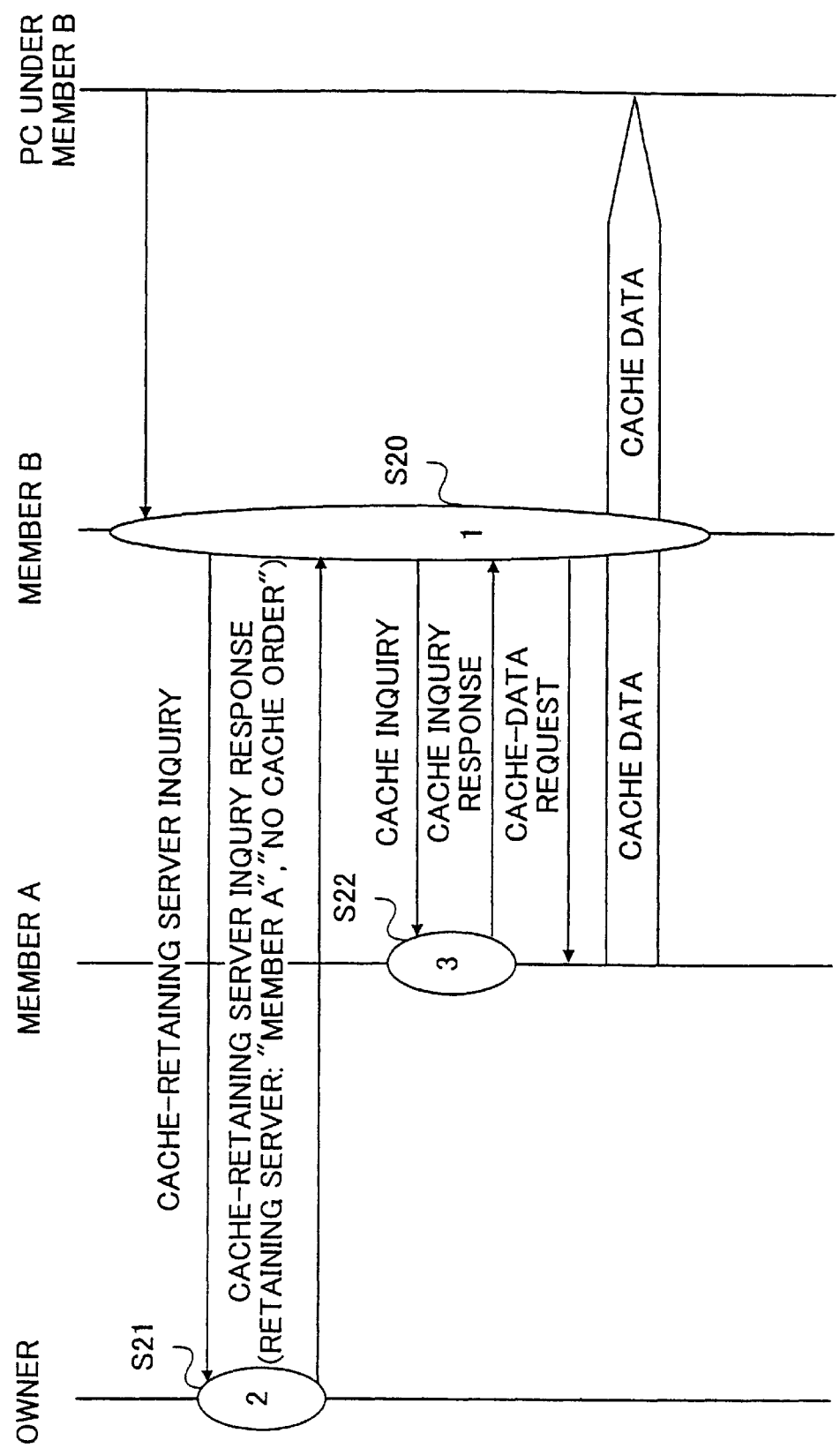
FIG. 24 is a sequence diagram of a process in a case of requested data existing in the distributed cache server system.

Next, a description will be given of a process in a case where the client PC makes a request to obtain data that exists in the distributed cache server system 1. FIG. 24 is a sequence diagram of the process in the case of requested data existing in the distributed cache server system 1.

In a step S20 indicated in FIG. 24, the member cache-server 10*b* receives an HTTP request as a data-obtain request from the client PC thereunder, and then, if the requested data is not cached in the cache-data DB 35 of its own (i.e., of the member cache-server 10*b*), performs the step S20 of requesting a cache-data inquiry.

Figure 25:
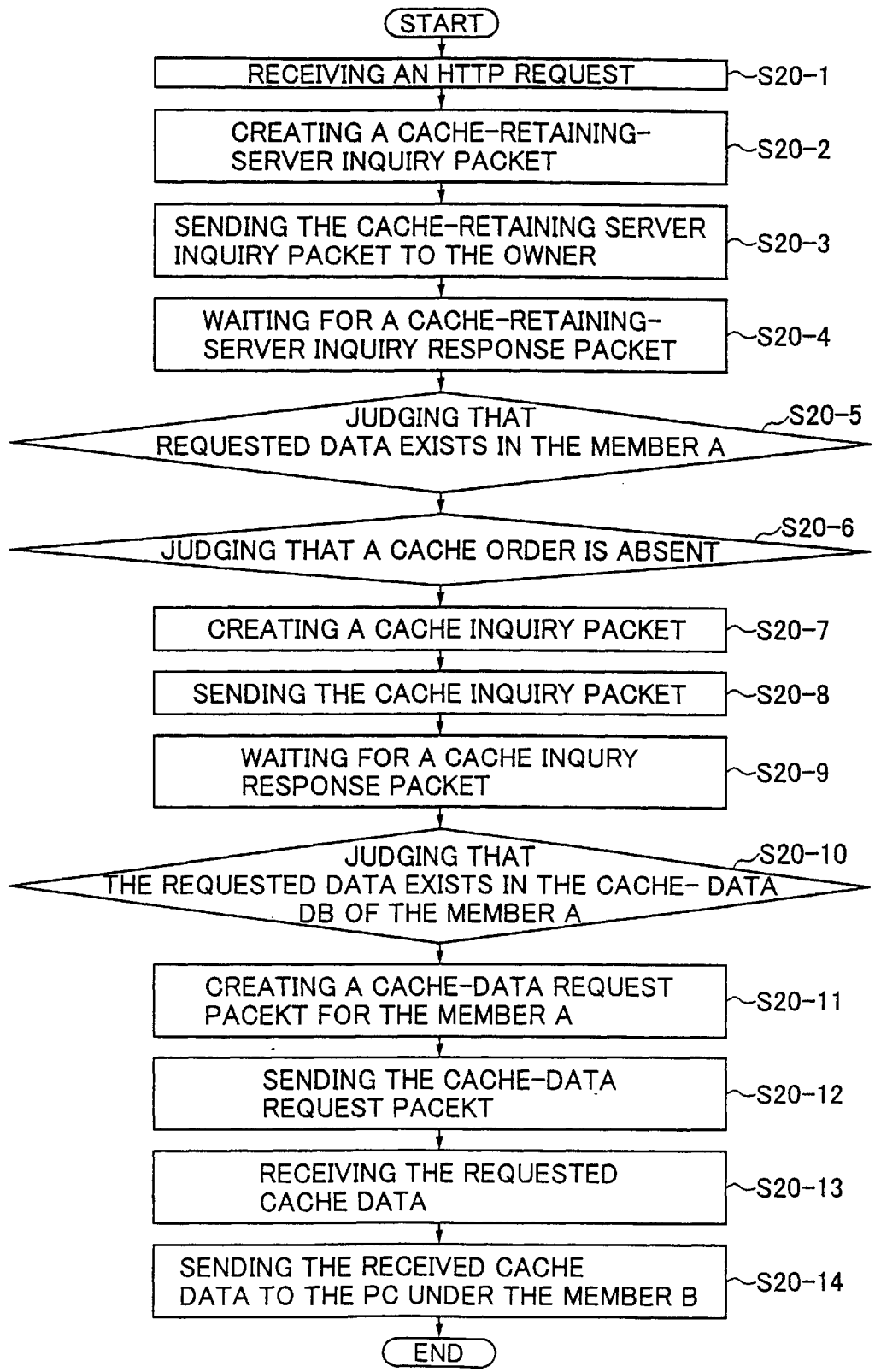
FIG. 25 is a flowchart of steps of requesting a cache-data inquiry according to the present embodiment.

FIG. 25 is a flowchart of the step S20 of requesting a cache-data inquiry according to the present embodiment. In a step S20-1, the member cache-server 10*b* receives an HTTP request as a data-obtain request from the client PC thereunder. Subsequently, in a step S20-2, the member cache-server 10*b* creates a cache-retaining-server inquiry packet, if the requested data is not cached in the cache-data DB 35 of its own (i.e., of the member cache-server 10*b*).

Subsequently, in a step S20-3, the member cache-server 10*b* sends the cache-retaining-server inquiry packet to the owner cache-server 11. Subsequently, in a step S20-4, the member cache-server 10*b* waits until the member cache-server 10*b* receives a cache-retaining-server inquiry response packet from the owner cache-server 11.

When the member cache-server 10*b* receives the cache-retaining-server inquiry response packet from the owner cache-server 11, the member cache-server 10*b* performs a step S20-5 next. In the step S20-5, the member cache-server 10*b* references the cache-retaining-server inquiry response packet so as to judge whether or not the requested data exists in the member cache-servers 10a and 10c of the distributed cache server system 1.

Since the sequence diagram shown in FIG. 24 is of the process in the case of requested data existing in the distributed cache server system 1, the member cache-server 10b judges that the requested data exists in the member cache-server 10a, for example, of the distributed cache server system 1. Subsequently, in a step S20-6, the member cache-server 10b judges the presence of a cache order described hereinafter. The sequence diagram shown in FIG. 24 is of a process in a case where the cache order is absent.

Subsequently, in a step S20-7, the member cache-server 10b creates a cache inquiry packet. Subsequently, in a step S20-8, the member cache-server 10b sends the cache inquiry packet to the member cache-server 10a. Subsequently, in a step S20-9, the member cache-server 10b waits until the member cache-server 10b receives a cache inquiry response packet from the member cache-server 10a.

When the member cache-server 10b receives the cache inquiry response packet from the member cache-server 10a, the member cache-server 10b performs a step S20-10 next. In the step S20-10, the member cache-server 10b references the cache inquiry response packet so as to judge whether or not the requested data is cached in the cache-data DB 35 of the member cache-server 10a.

Since the sequence diagram shown in FIG. 24 is of the process in the case of requested data existing in the distributed cache server system 1, the member cache-server 10b judges that the requested data exists in the cache-data DB 35 of the member cache-server 10a, for example.

Subsequently, in a step S20-11, the member cache-server 10b creates a cache-data request packet for the member cache-server 10a. Subsequently, in a step S20-12, the member cache-server 10b sends the cache-data request packet to the member cache-server 10a.

Subsequently, in a step S20-13, the member cache-server 10b receives the requested cache data from the member cache-server 10a. Subsequently, in a step S20-14, the member cache-server 10b sends the received cache data to the client PC thereunder.

Figure 26:
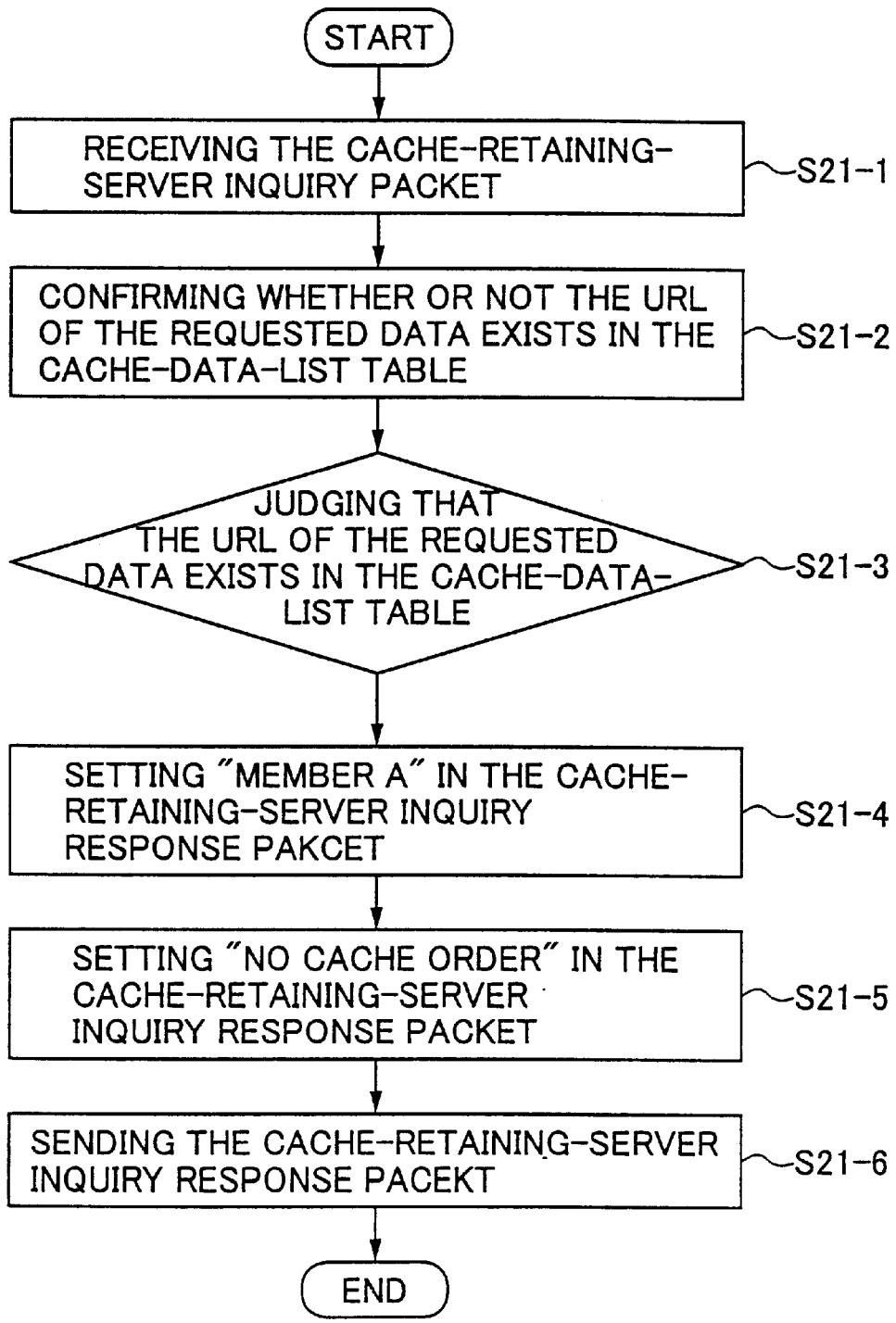
FIG. 26 is a flowchart of another steps of creating and sending a cache-retaining-server inquiry response according to the present embodiment.

In FIG. 24, the owner cache-server 11 performs a step S21 of creating and sending a cache-retaining-server inquiry response after receiving the cache-retaining-server inquiry packet from the member cache-server 10b. FIG. 26 is a flowchart of the step S21 of creating and sending the cache-retaining-server inquiry response according to the present embodiment.

In a step S21-1, the owner cache-server 11 receives the cache-retaining-server inquiry packet from the member cache-server 10b. Subsequently, in a step S21-2, the owner cache-server 11 references the cache-retaining-server inquiry packet, and confirms whether or not the requested data exists in the cache-data-list table 26.

Subsequently, in a step S21-3, the owner cache-server 11 judges whether or not the requested data exists in the cache-data-list table 26. Since the sequence diagram shown in FIG. 24 is of the process in the case of requested data existing in the distributed cache server system 1, the owner cache-server 11 judges that the requested data exists in the cache-data-list table 26.

Subsequently, in a step S21-4, the owner cache-server 11 sets "member A" in the cache-retaining-server inquiry response packet, "member A" meaning that the requested data exists in the member cache-server 10a of the distributed cache server system 1. Subsequently, in a step S21-5, the owner cache-server 11 sets "no cache order" in the cache-retaining-server inquiry response packet, "no cache order" meaning that the cache order is not to be performed.

Subsequently, in a step S21-6, the owner cache-server 11 sends the cache-retaining-server inquiry response packet to the member cache-server 10b.

Figure 27:
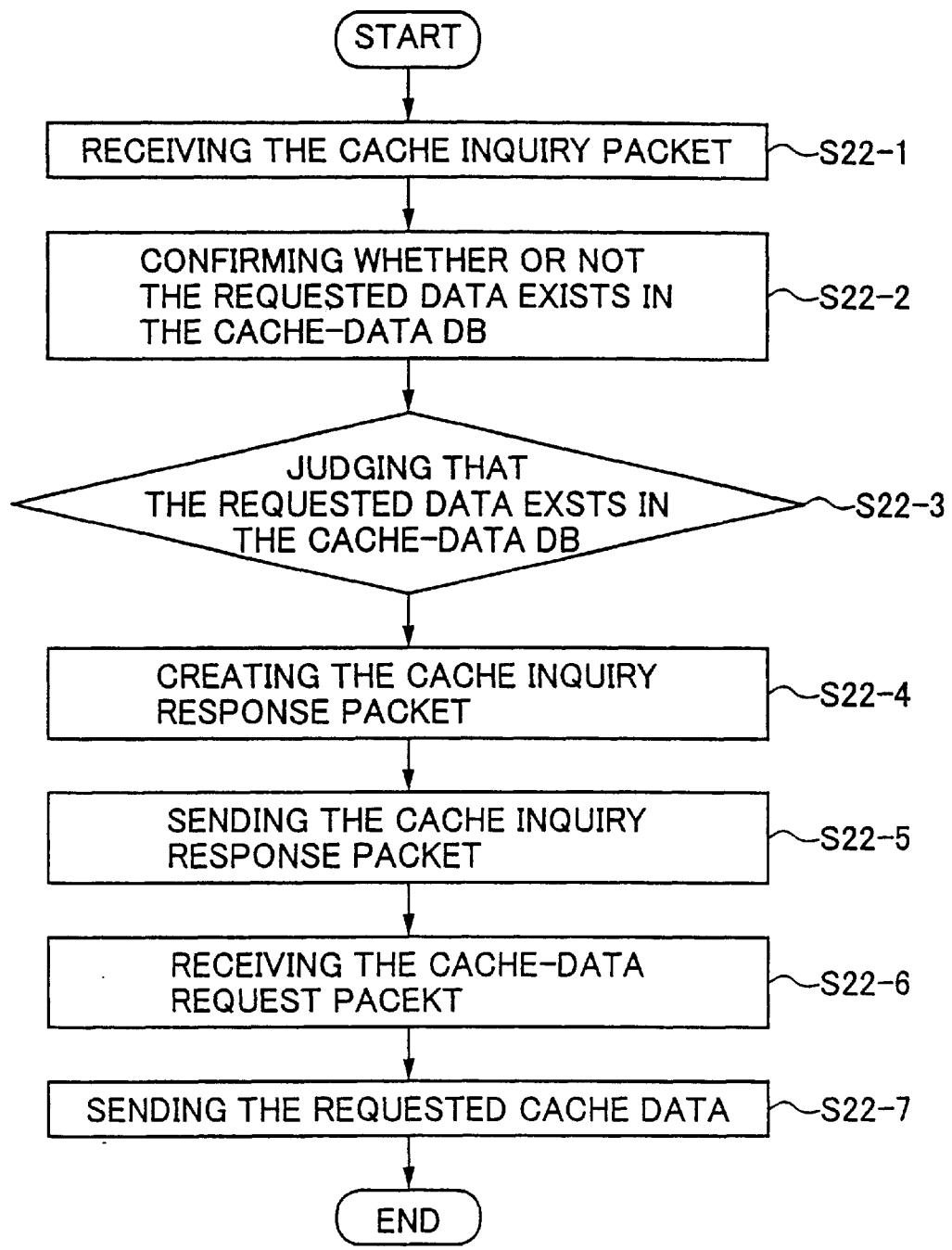
FIG. 27 is a flowchart of steps of administrating cache data according to the present embodiment.

In FIG. 24, the member cache-server 10a performs a step S22 of administrating cache data after receiving the cache inquiry packet or the cache-data request packet from the member cache-server 10b. FIG. 27 is a flowchart of the step S22 of administrating cache data according to the present embodiment.

In a step S22-1, the member cache-server 10a receives the cache inquiry packet from the member cache-server 10b. Subsequently, in a step S22-2, the member cache-server 10a references the cache inquiry packet, and confirms whether or not the requested data exists in the cache-data DB 35 of its own (i.e., of the member cache-server 10a).

Since the sequence diagram shown in FIG. 24 is of the process in the case of requested data existing in the distributed cache server system 1, the member cache-server 10a, in a step S22-3, judges that the requested data is cached in the cache-data DB 35 of the member cache-server 10a.

Subsequently, in a step S22-4, the member cache-server 10a cerates the cache inquiry response packet indicating that the requested data exists in the cache-data DB 35 of its own (i.e., of the member cache-server 10a). Subsequently, in a step S22-5, the member cache-server 10a sends the cache inquiry response packet to the member cache-server 10b.

Subsequently, in a step S22-6, the member cache-server 10a receives the cache-data request packet from the member cache-server 10b. Subsequently, in a step S22-7, the member cache-server 10a references the cache-data request packet so as to send the requested cache data to the member cache-server 10b.

Figure 28:
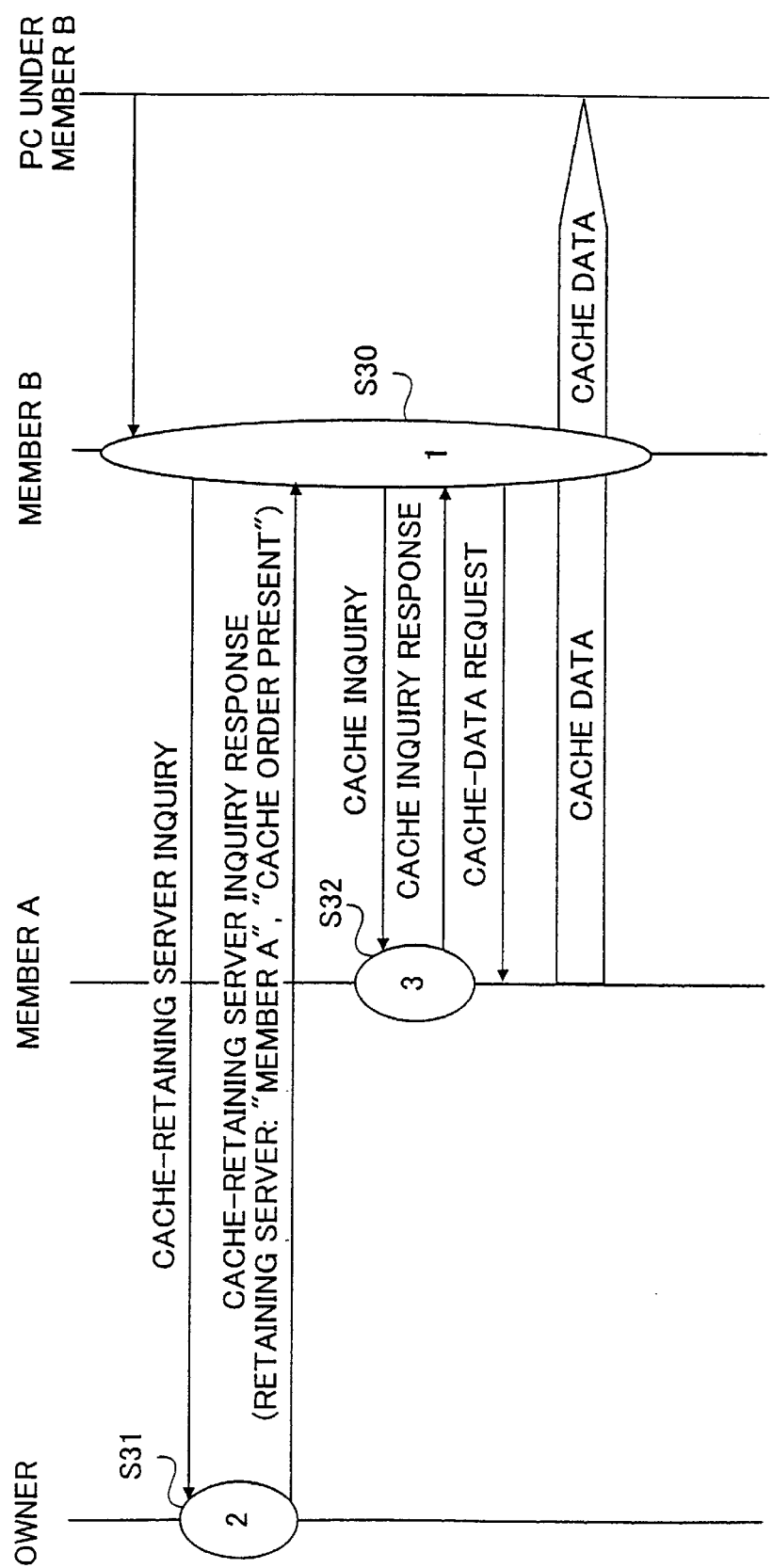
FIG. 28 is a sequence diagram of a process in a case of requested data existing in the distributed cache server system and a cache order being present.

Next, a description will be given of a process in a case where the client PC makes a request to obtain data that exists in the distributed cache server system 1 and the cache order is present. FIG. 28 is a sequence diagram of the process in the case of requested data existing in the distributed cache server system 1 and the cache order being present.

In a step S30 indicated in FIG. 28, the member cache-server 10b receives an HTTP request as a data-obtain request from the client PC thereunder, and then, if the requested data is not cached in the cache-data DB 35 of its own (i.e., of the member cache-server 10b), performs the step S30 of requesting a cache-data inquiry.

Figure 29:
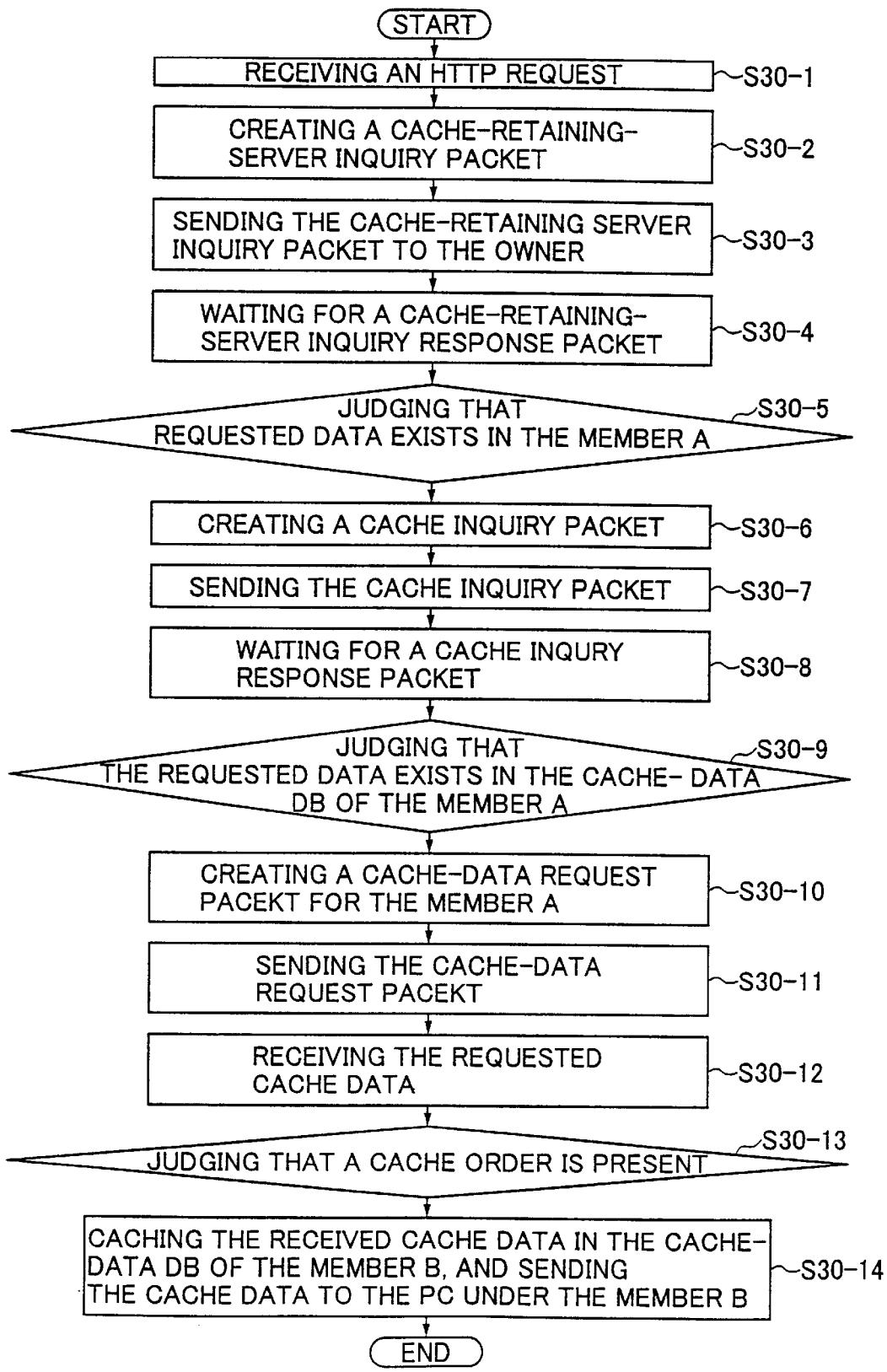
FIG. 29 is a flowchart of another steps of requesting a cache-data inquiry according to the present embodiment.

FIG. 29 is a flowchart of the step S30 of requesting a cache-data inquiry according to the present embodiment. It is noted that a step S30-1 to a step S30-4 are identical to the step S20-1 to the step S20-4 shown in FIG. 25, and will not be described in the following.

After the step S30-4, when the member cache-server 10b receives the cache-retaining-server inquiry response packet from the owner cache-server 11, the member cache-server 10b performs a step S30-5 next. In the step S30-5, the member cache-server 10b references the cache-retaining-server inquiry response packet so as to judge whether or not the requested data exists in the member cache-servers 10a and 10c of the distributed cache server system 1.

Since the sequence diagram shown in FIG. 28 is of the process in the case of requested data existing in the distributed cache server system 1, the member cache-server 10b judges that the requested data exists in the member cache-server 10a, for example, of the distributed cache server system 1. Subsequently, in a step S30-6, the member cache-server 10b creates a cache inquiry packet. It is noted that a step S30-6 to a step S30-12 are identical to the step S20-7 to the step S20-13 shown in FIG. 25, and will not be described in the following.

Subsequently, in a step S30-13 after the step S30-12, the member cache-server 10b judges the presence of a cache order. Since the sequence diagram shown in FIG. 28 is of the process in the case where the cache order is present, the member cache-server 10b judges that the cache order is present.

Subsequently, in a step S30-14, the member cache-server 10b caches the received cache data in the cache-data DB 35, and sends the cache data to the client PC under the member cache-server 10b.

Figure 30:
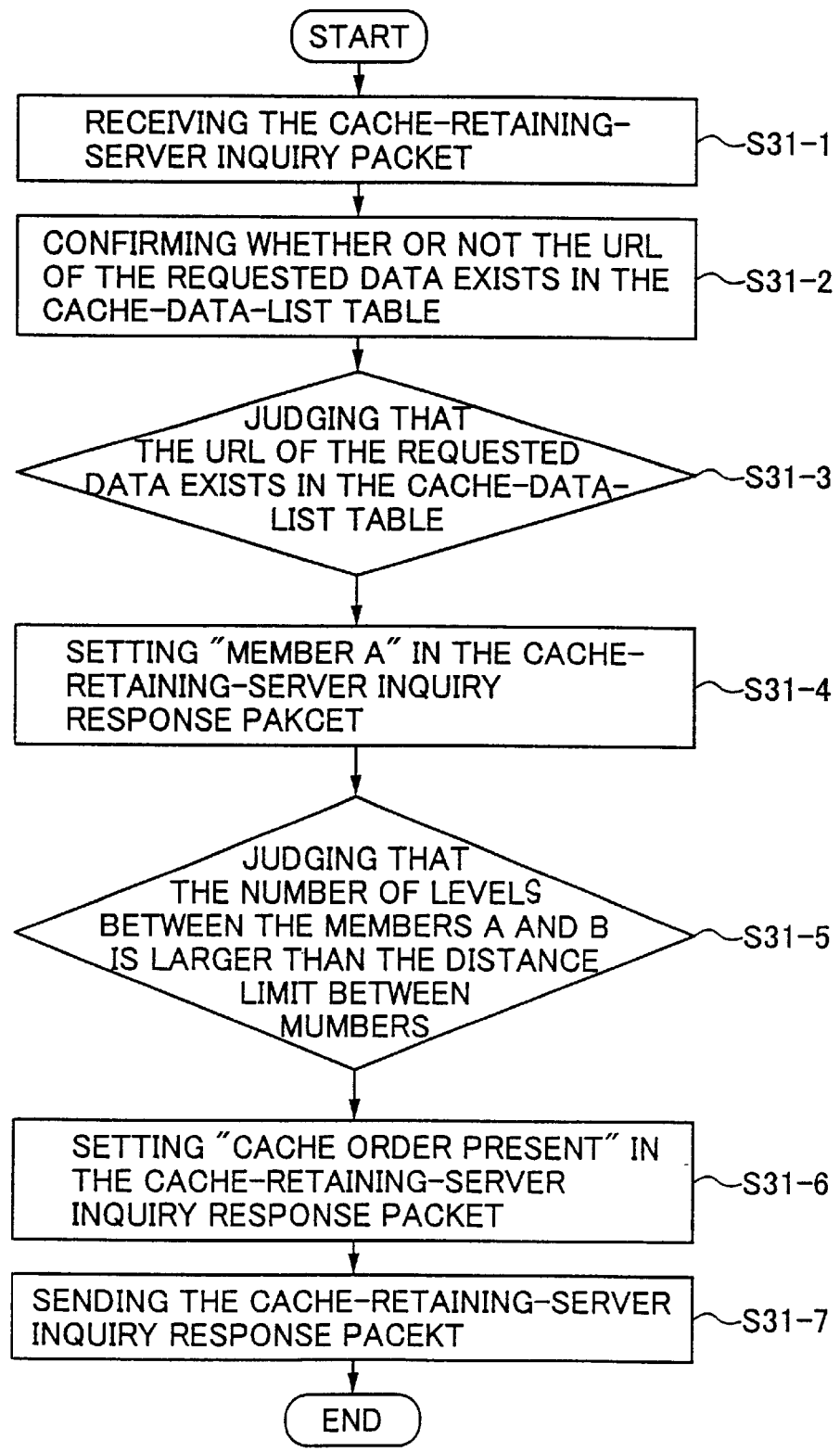
FIG. 30 is a flowchart of still another steps of creating and sending a cache-retaining-server inquiry response according to the present embodiment.

In FIG. 28, the owner cache-server 11 performs a step S31 of creating and sending a cache-retaining-server inquiry response after receiving the cache-retaining-server inquiry packet from the member cache-server 10b. FIG. 30 is a flowchart of the step S31 of creating and sending the cache-retaining-server inquiry response according to the present embodiment. It is noted that a step S31-1 to a step S31-4 are identical to the step S21-1 to the step S21-4 shown in FIG. 26, and will not be described in the following.

Subsequently, in a step S31-5 after the step S31-4, the owner cache-server 11 references the relative-position information table 27 shown in FIG. 5 and FIG. 10 so as to read the number of levels (distance) between the member cache-server 10a and the member cache-server 10b. Then, the owner cache-server 11 judges whether or not the number of levels between the member cache-server 10a and the member cache-server 10b is larger than the distance limit between member cache-servers set in the settings-information table 24 shown in FIG. 5 and FIG. 6. For convenience' sake in explanation here, the distance limit between member cache-servers is assumed to be "1" despite "3" shown in FIG. 6.

Since the sequence diagram shown in FIG. 28 is of the process in the case where the cache order is present, the owner cache-server 11 judges that the number of levels between the member cache-server 10a and the member cache-server 10b is larger than the distance limit between member cache-servers set in the settings-information table 24.

Subsequently, in a step S31-6, the owner cache-server 11 sets "cache order present" in the cache-retaining-server inquiry response packet, "cache order present" meaning that the cache order is to be performed. Subsequently, in a step S31-7, the owner cache-server 11 sends the cache-retaining-server inquiry response packet to the member cache-server 10b.

In FIG. 28, the member cache-server 10a performs a step S32 of administrating cache data after receiving the cache inquiry packet or the cache-data request packet from the member cache-server 10b. It is noted that the step S32 is identical to the step S22 shown in FIG. 24 and FIG. 27, and will not be described here.

Figure 31:
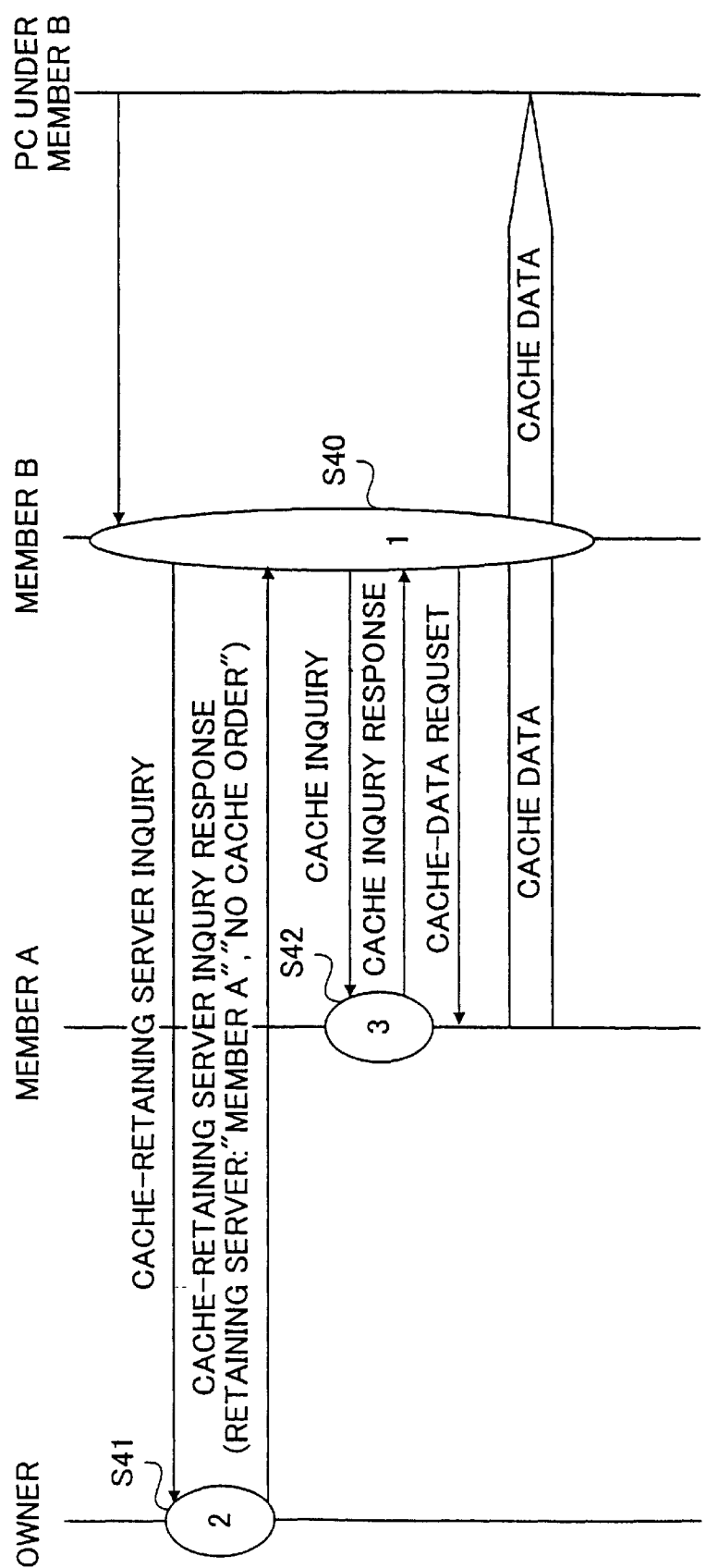
FIG. 31 is a sequence diagram of a process in a case of requested data existing in the distributed cache server system and including frequently accessed data.

Next, a description will be given of a process in a case where the client PC makes a request to obtain data that exists in the distributed cache server system 1 and the requested data includes frequently accessed data. FIG. 31 is a sequence diagram of the process in the case of requested data existing in the distributed cache server system 1 and including frequently accessed data.

In a step S40 indicated in FIG. 31, the member cache-server 10b receives an HTTP request as a data-obtain request from the client PC thereunder, and then, if the requested data is not cached in the cache-data DB 35 of its own (i.e., of the member cache-server 10b), performs the step S40 of requesting a cache-data inquiry.

Figure 32:
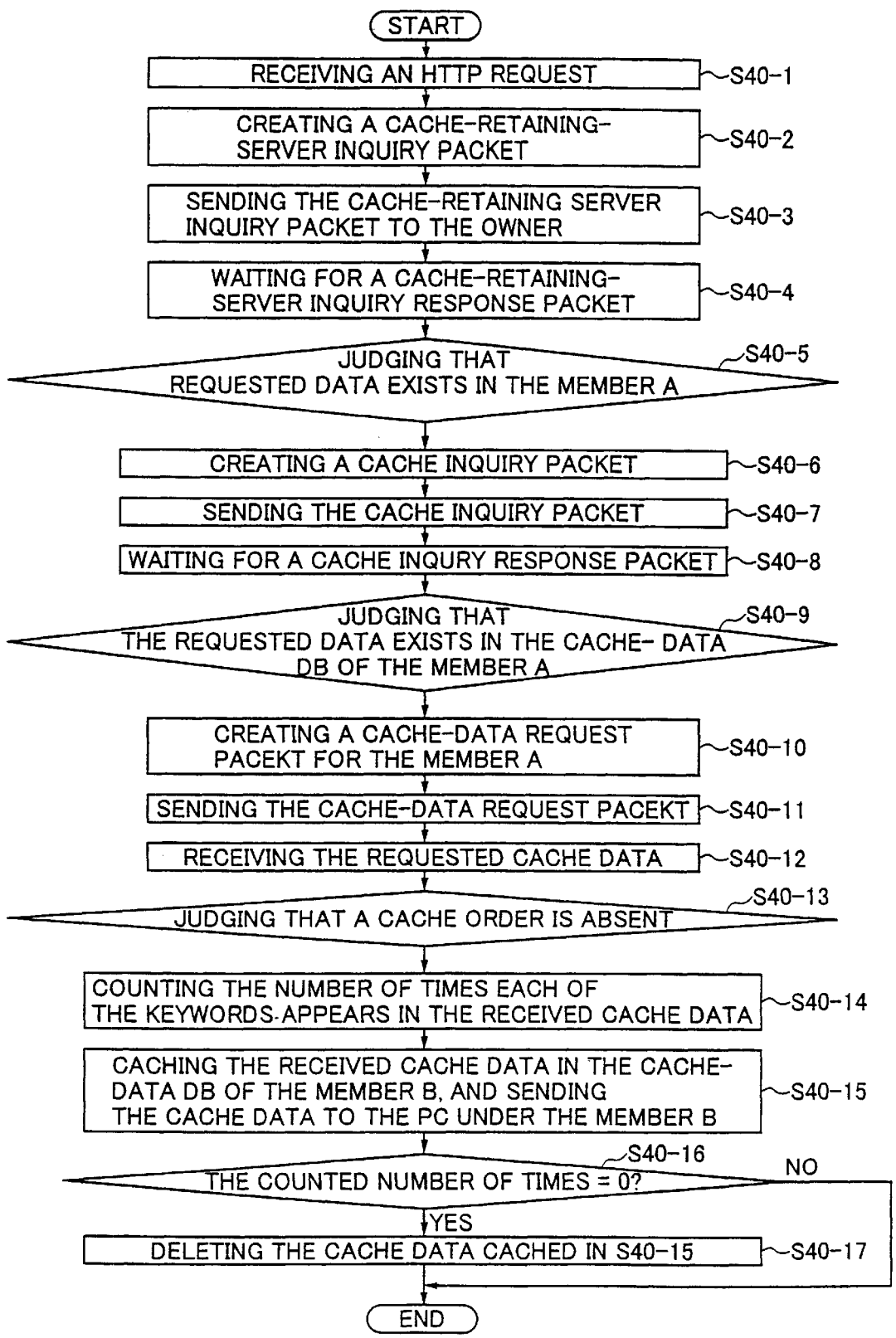
FIG. 32 is a flowchart of still another steps of requesting a cache-data inquiry according to the present embodiment.

FIG. 32 is a flowchart of the step S40 of requesting a cache-data inquiry according to the present embodiment. It is noted that a step S40-1 to a step S40-12 are identical to the step S30-1 to the step S30-12 shown in FIG. 29, and will not be described in the following.

Subsequently, in a step S40-13 after the step S40-12, the member cache-server 10b judges the presence of a cache order. In the sequence diagram shown in FIG. 31, the member cache-server 10b judges that the cache order is absent. Subsequently, in a step S40-14, the member cache-server 10b references the keywords registered in the keyword-information table 36 shown in FIG. 11 and FIG. 12, and then counts the number of times each of the keywords appears in the received cache data.

The counted number of times is set in the keyword-information table 36 as the frequency of appearances. Subsequently, in a step S40-15, the member cache-server 10b caches the received cache data in the cache-data DB 35, and sends the cache data to the client PC under the member cache-server 10b.

Subsequently, in a step S40-16, the member cache-server 10b judges whether or not the frequency of appearances in the keyword-information table 36 is zero. If the member cache-server 10b judges that the frequency of appearances is zero (YES in the step S40-16 in FIG. 32), the member cache-server 10b performs a step S40-17 next, in which the member cache-server 10b deletes the cache data cached in the step S40-15, and then ends the step S40 of requesting a cache-data inquiry. On the other hand, if the member cache-server 10b judges that the frequency of appearances is not zero (NO in the step S40-16 in FIG. 32), the member cache-server 10b ends the step S40 of requesting a cache-data inquiry.

In FIG. 31, the owner cache-server 11 performs a step S41 of creating and sending a cache-retaining-server inquiry response after receiving the cache-retaining-server inquiry packet from the member cache-server 10b. It is noted that the step S41 is identical to the step S21 shown in FIG. 24 and FIG. 26, and will not be described here.

In FIG. 31, the member cache-server 10a performs a step S42 of administrating cache data after receiving the cache inquiry packet or the cache-data request packet from the member cache-server 10b. It is noted that the step S42 is identical to the step S22 shown in FIG. 24 and FIG. 27, and will not be described here.

Next, a description will be given of a process of deleting cache data from the cache-data DB 35. There are types of the cache-data deleting process: one led by the member cache-server; and another led by the owner cache-server.

Figure 33:
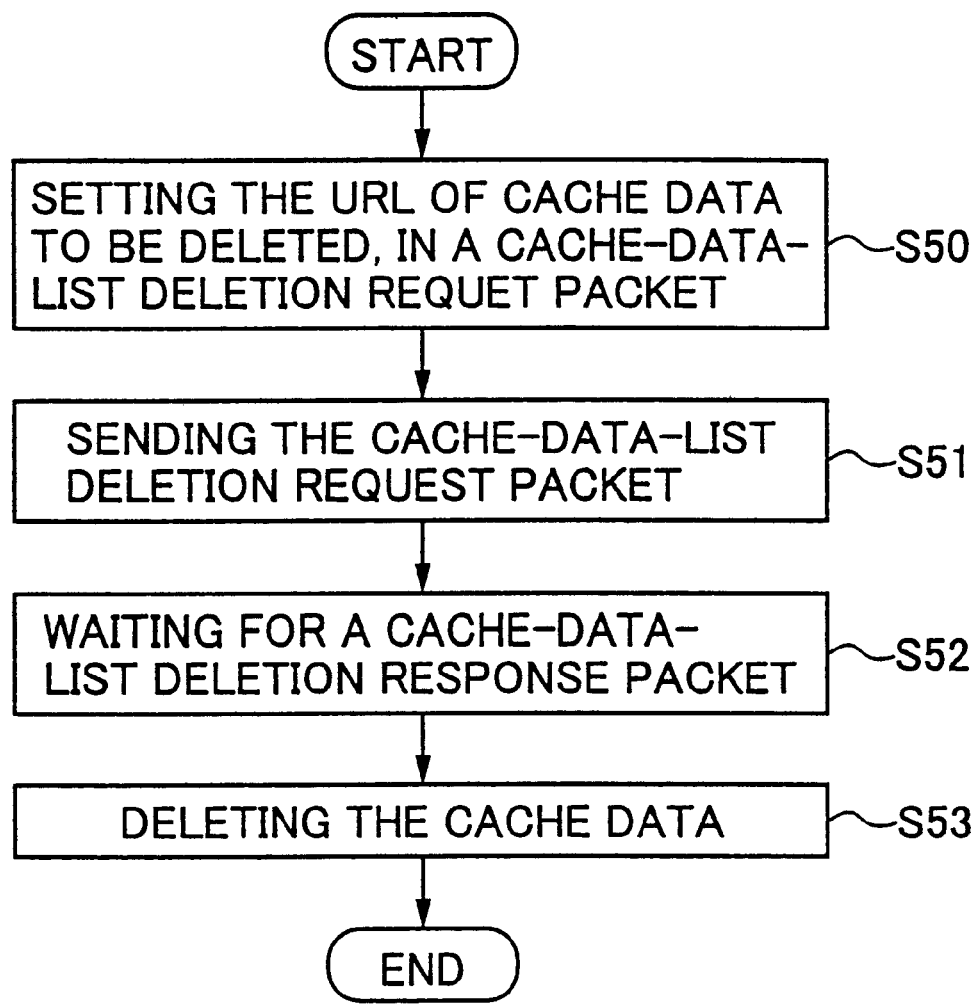
FIG. 33 is a flowchart of a cache-data deleting process led by the member cache-server according to the present embodiment.

FIG. 33 is a flowchart of the cache-data deleting process led by the member cache-server according to the present embodiment. The cache-data deleting process led by the member cache-server is performed, for example, when the remaining disk capacity of the member cache-server 10a falls below the minimum vacant capacity set in the settings-information table 34 shown in FIG. 11 (and FIG. 6).

In a step S50, the member cache-server 10a sets, for example, the URL of cache data to be deleted from the cache-data DB 35 in a cache-data-list deletion request packet. Subsequently, in a step S51, the member cache-server 10a sends the cache-data-list deletion request packet to the owner cache-server 11.

Subsequently, in a step S52, the member cache-server 10a waits until the member cache-server 10a receives a cache-data-list deletion response packet from the owner cache-server 11. When the member cache-server 10a receives the cache-data-list deletion response packet, the member cache-server 10a performs a step S53, in which the member cache-server 10a deletes the cache data from the cache-data DB 35 according to the cache-data-list deletion response packet.

FIG. 34 is a flowchart of the cache-data deleting process led by the owner cache-server according to the present embodiment. In a step S61, the owner cache-server 11 scans the cache-data-list table 26 for the URL, for example, of data cached by the member cache-server 10a, according to the cache-data-list addition request packet described above with reference to FIG. 22 and FIG. 23 (the step S12 and the step S13).

Subsequently, in a step S62, the owner cache-server 11 judges whether or not the URL of the data cached by the member cache-server 10a exists in the cache-data-list table 26. The flowchart shown in FIG. 34 is of the process in a case where the URL of the cached data exists in the cache-data-list table 26.

Subsequently, in a step S63, the owner cache-server 11 compares the data creation date (and time) of the URL existing in the cache-data-list table 26 with a data creation date (and time) of the URL according to the cache-data-list addition request packet so as to judge whether or not the data creation date (and time) of the URL existing in the cache-data-list table 26 is older than the data creation date (and time) of the URL according to the cache-data-list addition request packet. The flowchart shown in FIG. 34 is of the process in a case where the data creation date (and time) of the URL existing in the cache-data-list table 26 is older than the data creation date (and time) of the URL according to the cache-data-list addition request packet.

Subsequently, in a step S64, the owner cache-server 11 deletes the URL and other items corresponding to the URL of the data cached by the member cache-server 10a from the cache-data-list table 26. Subsequently, in a step S65, the owner cache-server 11 creates a cache deletion packet including the URL and the other items deleted from the cache-data-list table 26. Subsequently, in a step S66, the owner cache-server 11 sends the cache deletion packet to the member cache-server 10a.

In a step S67, the member cache-server 10a receives the cache deletion packet from the owner cache-server 11. Subsequently, in a step S68, the member cache-server 10a deletes the cache data from the cache-data DB 35 according to the URL and the other items included in the cache deletion packet.

In the above-mentioned embodiment, the description will be given of the owner cache-server 11 and the member cache-servers 10a to 10c having a double hierarchical structure. The owner cache-server 11 and the member cache-servers 10a to 10c can have a triple hierarchical structure.

Figure 35:
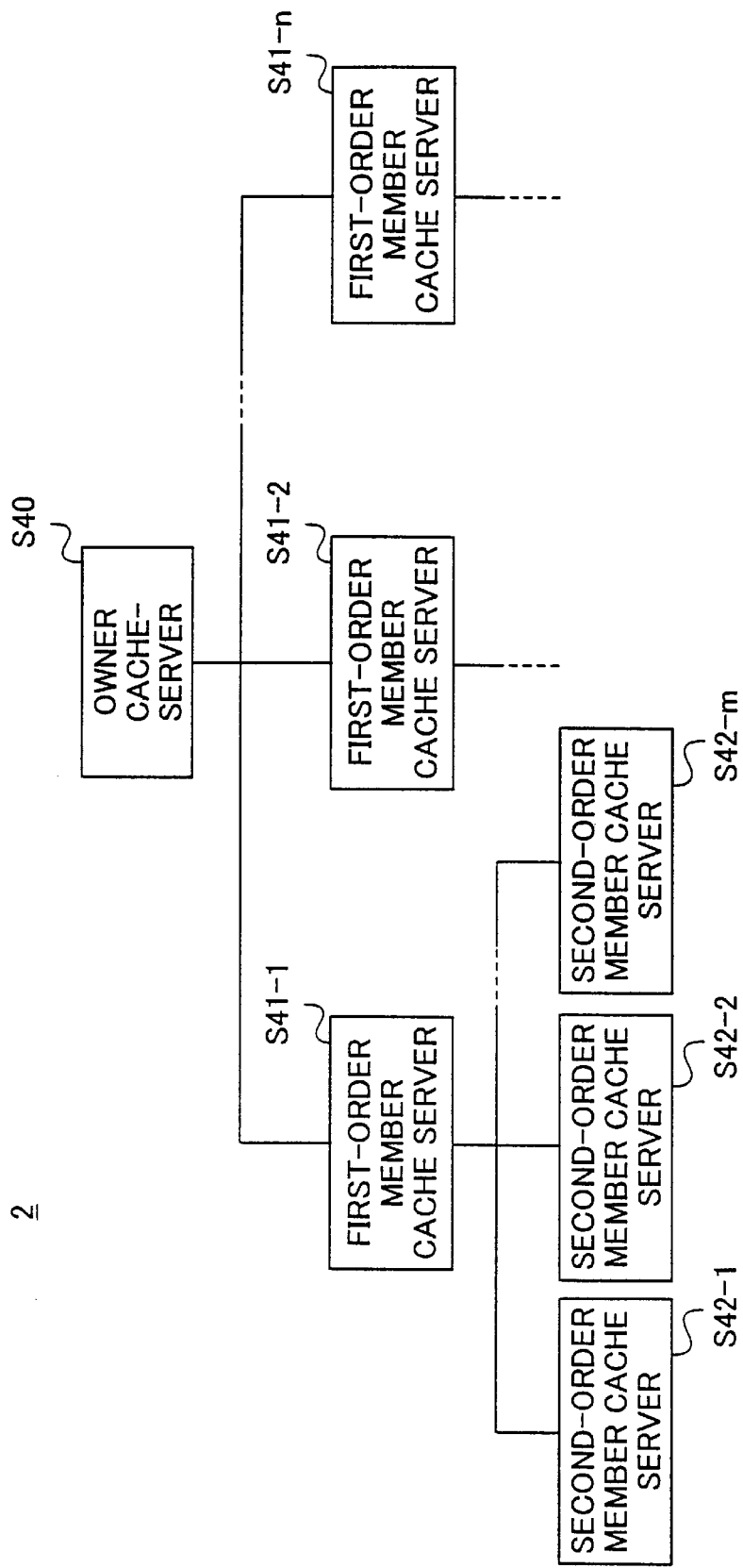
FIG. 35 illustrates a configuration of a distributed cache server system according to another embodiment of the present invention.

FIG. 35 illustrates a configuration of a distributed cache server system according to another embodiment of the present invention. A distributed cache server system 2 comprises an owner cache-server 40, first-order member cache-servers 41-1 to 41-n, and second-order member cache-servers 42-1 to 42-m.

The owner cache-server 40 and the first-order member cache-servers 41-1 to 41-n are structured in the same manner as the owner cache-server 11 and the member cache-servers 10a to 10c in the distributed cache server system 1 shown in FIG. 4. The relationship between the first-order member cache-servers 41-1 to 41-n and the second-order member cache-servers 42-1 to 42-m can be considered as follows.

Assuming that the first-order member cache-server 41-1, for example, is an owner cache-server, and the second-order member cache-servers 42-1 to 42-m are member cache-servers, the first-order member cache-server 41-1 and the second-order member cache-servers 42-1 to 42-m can be considered as being structured in the same manner as the owner cache-server 11 and the member cache-servers 10a to 10c in the distributed cache server system 1 shown in FIG. 4.

Accordingly, by adding the elements typical of the owner cache-server 40 to the first-order member cache-server 41-1 so that the first-order member cache-server 41-1 functioning also as an owner cache-server administrates cache data retained by the second-order member cache-servers 42-1 to 42-m, the distributed cache server system 2 can multiply perform the same processes as the distributed cache server system 1.

The present invention is not limited to the specifically disclosed embodiments, and variations and modifications may be made without departing from the scope of the present invention.

The present application is based on Japanese priority application No. 2001-048800 filed on Feb. 23, 2001, the entire contents of which are hereby incorporated by reference.

What is claimed is:

1. A cache server provided in an internal network, the cache server comprising:

a cache-data-list table storing information concerning data retained by other cache servers on an individual cache server basis;

a cache-data-list administrating unit receiving a data-inquiry request from one of said other cache servers, and searching said cache-data-list table for cache-server information indicating another one of said other cache servers retaining data regarding said data-inquiry request so as to send said cache-server information to said one of said other cache server;

a relative-position information table storing information indicating a distance of at least one hop between each two of said other cache servers; and a control-data sending and receiving unit obtaining said distance between said one of said other cache servers and said another one of said other cache servers from said relative-position information table so as to order said one of said other cache servers to retain said data regarding said data-inquiry request depending on said distance;

wherein said control-data sending and receiving unit orders said one of said other cache servers to retain said data regarding said data-inquiry request when said distance between said one of said other cache servers and said another one of said other cache servers is larger than a predetermined distance.

2. A distributed cache server system provided in an internal network, the distributed cache server system comprising:

an owner cache server; and member cache servers, each of which retains data from an external network, and sends information concerning said data to said owner cache server so that said owner cache server stores said information so as to search for cache-server information therefrom indicating one of said member cache servers retaining data regarding a data-obtain request received from within said internal network;

wherein, when said owner cache server finds said cache-server information, another one of said member cache servers obtains the data regarding said data-obtain request from said one of said member cache servers, and when said owner cache server does not find the cache-server information, said another one of said member cache servers obtains the data regarding said data-obtain request from said external network;

wherein said owner cache server includes:
- a cache-data-list table storing said information;
- a cache-data-list administrating unit receiving a data-inquiry request from another one of said member cache servers, and searching said cache-data-list table for the cache-server information indicating the one of said member cache servers retaining data regarding said data-inquiry request so as to send said cache-server information to said another one of said member cache servers;
- a relative-position information table storing information indicating a distance of at least one hop between each two of said member cache servers; and
- a control-data sending and receiving unit obtaining said distance between said one of said member cache servers and said another one of said member cache servers from said relative-position information table so as to order said another one of said member cache servers to retain said data regarding said data-inquiry request depending on said distance; and wherein each of said member cache servers includes:
- a cache-data database retaining the data from said external network;
- a cache-data sending and receiving unit sending information concerning said data retained from said external network to said owner cache server
- a keyword-information table storing keywords; and
- a cache-data administrating unit counting a number of times each of said keywords appears in said data obtained from said one of said member cache servers, so that said another one of said member cache servers retains said data obtained from said one of said member cache servers in said cache-data database depending on said number of the times.

* * * * *